US010111167B2

(12) United States Patent
Zhou et al.

(10) Patent No.: US 10,111,167 B2
(45) Date of Patent: Oct. 23, 2018

(54) DETECTION AND RESOLUTION OF A REDUCED VERSION BASIC SERVICE SET IDENTIFIER COLLISION

(71) Applicant: QUALCOMM Incorporated, San Diego, CA (US)

(72) Inventors: Yan Zhou, San Diego, CA (US); Gwendolyn Denise Barriac, Encinitas, CA (US); Simone Merlin, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 15/148,071

(22) Filed: May 6, 2016

(65) Prior Publication Data

US 2016/0345258 A1    Nov. 24, 2016

Related U.S. Application Data

(60) Provisional application No. 62/165,782, filed on May 22, 2015.

(51) Int. Cl.
*H04W 52/02*    (2009.01)
*H04L 29/12*    (2006.01)
(Continued)

(52) U.S. Cl.
CPC ..... *H04W 52/0206* (2013.01); *H04L 61/6022* (2013.01); *H04W 48/16* (2013.01);
(Continued)

(58) Field of Classification Search
CPC .......... H04L 61/6022; H04W 52/0206; H04W 88/08; H04W 84/12; H04W 48/16;
(Continued)

(56) References Cited

U.S. PATENT DOCUMENTS

2014/0192809 A1    7/2014    Park
2014/0286203 A1    9/2014    Jindal et al.
(Continued)

OTHER PUBLICATIONS

ISA/EP, International Search Report and Written Opinion of the International Searching Authority, Int'l. App. No. PCT/US2016/031515, dated Aug. 4, 2016, European Patent Office, Rijswijk, NL, 11 pgs.
(Continued)

*Primary Examiner* — Paul H Masur
(74) *Attorney, Agent, or Firm* — Holland & Hart LLP/Qualcomm

(57) ABSTRACT

Methods, systems, and devices are described for wireless communication. A wireless node may detect and resolve collisions in reduced version of basic service set identifiers (BSSIDs). The collisions may be the result of multiple basic service sets (BSSs) using the same values for reduced versions of BSSIDs. For example, the BSSs may use the same value for X-bit color indicators which results in a color collision if the BSSs are neighbor BSSs. When such a scenario occurs, the node may detect the collision by referencing reduced version BSSID information from broadcasts or backhaul communications with one of the involved BSSs. Alternatively, the node may determine that frames from two different BSSs include the same color bits. The node may resolve the detected color collision by triggering a change in the reduced version BSSID for one of the involved BSSs.

28 Claims, 19 Drawing Sheets

(51) Int. Cl.
*H04W 48/16* (2009.01)
*H04W 84/12* (2009.01)
*H04W 88/08* (2009.01)

(52) U.S. Cl.
CPC ............ *H04W 84/12* (2013.01); *H04W 88/08* (2013.01); *Y02D 70/142* (2018.01); *Y02D 70/22* (2018.01)

(58) Field of Classification Search
CPC ...... Y02B 60/50; Y02D 70/00; Y02D 70/142; Y02D 70/22
See application file for complete search history.

(56) References Cited

U.S. PATENT DOCUMENTS

| | | | |
|---|---|---|---|
| 2016/0353275 A1* | 12/2016 | Liu | H04W 8/26 |
| 2017/0006661 A1* | 1/2017 | Huang | H04W 84/12 |
| 2017/0064713 A1* | 3/2017 | Barriac | H04W 72/0453 |
| 2017/0257817 A1* | 9/2017 | Itagaki | H04W 48/08 |

OTHER PUBLICATIONS

Ko et al., "Issues on BSS Color Bits Collision," doc.: IEEE 802.11-16/0396r0, Mar. 14, 2016, 18 pgs., Institute of Electrical and Electronics Engineers.

* cited by examiner

DETECTION AND RESOLUTION OF A REDUCED VERSION BASIC SERVICE SET IDENTIFIER COLLISION

CROSS REFERENCES

The present application for patent claims priority to U.S. Provisional Patent Application No. 62/165,782 by Zhou et al., entitled "Detection and Resolution of a Reduced Version BSS Identifier," filed May 22, 2015, assigned to the assignee hereof.

BACKGROUND

The following relates generally to wireless communication including, for example, detection and resolution of use of a same value for a reduced version of a basic service set identifier.

Wireless communications systems are widely deployed to provide various types of communication content such as voice, video, packet data, messaging, broadcast, and so on. A wireless network, for example a wireless local area network (WLAN), may include an access point (AP) that may communicate with one or more stations (STAs) or mobile devices. The AP may be coupled to a network, such as the Internet, and may enable a mobile device to communicate via the network (or communicate with other devices coupled to the AP in a service set, e.g., a basic service set (BSS) or extended service set (ESS)). A wireless device may communicate with a network device bi-directionally. For example, in a WLAN, a STA may communicate over a wireless medium with an associated AP via downlink (DL) and reverse link (UL). From the perspective of the STA, the DL (or forward link) may refer to the communication link from the AP to the STA, and the UL (or reverse link) may refer to the communication link from the STA to the AP. In a BSS, a single AP may serve multiple STAs within a given area (e.g., the coverage area of the AP). Each BSS may be uniquely identified by a basic service set identifier (BSSID). Accordingly, a node may distinguish between communications from different BSSs by referencing the BSSID for each communication. In some cases, a wireless communication system may reduce power consumption and improve reuse by using reduced versions of BSSIDs (e.g., BSSs may use X-bit color indicators that are smaller than BSSIDs).

In some cases, the values for a reduced version of BSSIDs for two BSS are identical or indistinguishable (e.g., an AP may initially select the same X-bit color indicator as a neighbor AP). In such an instance, a STA located at the intersection of two BSSs using the same reduced version BSSID may receive communications from a BSS with which the STA is unassociated, meaning that the received communications may not actually have any relevance to the STA. Nevertheless, because the received communications include a same reduced version BSSID as a BSS with which the STA is in communication, the STA may wake up to process the transmission from the unassociated BSS even though the transmission does not include relevant data for the STA. Processing extraneous transmissions may result in unnecessary power consumption and limit system performance.

SUMMARY

Systems, methods, and apparatuses for detection and resolution of basic service set (BSS) reduced version identifier collisions are described. A wireless system may include a number of BSSs, each of which is identified by a corresponding basic service set identifier (BSSID). In some cases, the wireless system may implement reduced versions of the BSSIDs. For example, the system may use X-bit color indicators ("colors") to distinguish one BSS over another. A wireless node may detect that two BSSs are associated with a color collision—that is, the two BSSs are using the same color bits. Based at least in part on the detection, the node may trigger a change in color bits for one or both of the BSSs.

A node may detect a collision of reduced versions of BSSIDs by various means. For example, the node may detect the collision via color-use information conveyed via a broadcast from one of the BSSs. In some examples the node may detect the collision by determining that two received frames use the same colors but originate from different BSSs. Additionally or alternatively, the node may detect the collision by obtaining color-use information via backhaul communications. Once the collision has been detected, the node may trigger a change in color bits for one of the BSSs involved in the collision. The changing BSS may be associated with, or unassociated with, the detecting node.

A method of wireless communication is described. The method may include detecting that a first BSS and a second BSS are using a same value for reduced versions of respective BSSIDs, and triggering, based at least in part on the detection, a change in the value for at least one BSS selected from the group consisting of the first BSS and the second BSS.

A communications device for wireless communication is described. The communications device may include means for detecting that a first BSS and a second BSS are using a same value for reduced versions of respective BSSIDs, and means for triggering, based at least in part on the detection, a change in the value for at least one of the first BSS and the second BSS.

Another communications device for wireless communication is described. The communications device may include a processor, memory in communication with the processor, and instructions stored in the memory. The instructions may be executable by the processor to cause the communications device to detect that a first BSS and a second BSS are using a same value for reduced versions of respective BSSIDs, and trigger, based at least in part on the detection, a change in the value for at least one of the first BSS and the second BSS.

A non-transitory computer-readable medium storing code for wireless communication is described. The code may include instructions executable to detect that a first BSS and a second BSS are using a same value for reduced versions of respective BSSIDs, and trigger, based at least in part on the detection, a change in the value for at least one of the first BSS and the second BSS.

Another communications device for wireless communication is described. The communications device may include a reduced version BSSID detector for detecting that a first BSS and a second BSS are using a same value for reduced versions of respective BSSIDs, and a reduced version BSSID administrator for triggering, based at least in part on the detection, a change in the value for at least one of the first BSS and the second BSS.

In some examples of the method, communications devices, or non-transitory computer-readable medium, detecting that the first BSS and the second BSS are using the same value includes steps, features, means, instructions, or a communication coordinator for receiving a broadcast communication from an access point of the second BSS, wherein the broadcast communication includes the value for the second BSS. Some examples include steps, features, means, instructions, or a communication coordinator for receiving the value for the second BSS from a station associated with the first BSS, the value for the second BSS having been received at the station associated with the first BSS via a broadcast communication from an access point of the second BSS.

In some examples of the method, communications devices, or non-transitory computer-readable medium, triggering the change from the same value includes steps, features, means, instructions, or a reduced version BSSID evaluator for determining a new value for the at least one selected identifier that is not in use by the first BSS or the second BSS, wherein the change from the same value is based at least in part on the new value. In some examples, determining the new value also includes determining that the new value is not in use by neighboring BSSs other than the first BSS and the second BSS.

In some examples of the method, communications devices, or non-transitory computer-readable medium, triggering the change from the same value includes steps, features, means, instructions, or a reduced version BSSID evaluator for determining, for one of the first BSS or the second BSS, a new value for a reduced version of a BSSID that is not in use by the other of the first BSS or the second BSS, wherein the triggered change from the same value is based at least in part on the new value.

In some examples of the method, communications devices, or non-transitory computer-readable medium, triggering the change from the same value includes steps, features, means, instructions, or a communication coordinator for receiving a broadcast communication comprising information associated with an access point of the second BSS, wherein the information includes at least one selected from the group consisting of: a setup time for reduced versions of BSSIDs, a quantity of available values for reduced versions of BSSIDs of the second BSS, a quantity of available values for reduced versions of BSSIDs of other BSSs that neighbor the second BSS, a quantity of stations associated with the second BSS, and a quantity of active stations. Some examples further include steps, features, means, instructions, or an access point information comparator for comparing the received broadcast information to corresponding information of the first BSS, wherein the triggering is based at least in part on the comparison.

Some examples of the method, communications devices, or non-transitory computer-readable medium include steps, features, means, instructions, or a communication coordinator for receiving a first frame from the first BSS, the first frame including the value for the first BSS and receiving a second frame from the second BSS, the second frame including the value for the second BSS. Some examples further include steps, features, means, instructions, or a media access control (MAC) address identifier for identifying a MAC address of the first BSS in the first frame, identifying a MAC address of the second BSS in the second frame, and determining, based at least in part on the MAC address of the first BSS and the MAC address of the second BSS, that the first frame and the second frame are from different BSSs.

In some examples of the method, communications devices, or non-transitory computer-readable medium, triggering the change from the same value includes steps, features, means, instructions, or a collision reporter for sending a collision report to one or both of a first access point associated with the first BSS or a second access point associated with the second BSS, the collision report indicating that the first BSS and the second BSS have the same value for reduced versions of respective BSSIDs.

In some examples of the method, communications devices, or non-transitory computer-readable medium, detecting that the first BSS and the second BSS are using the same value includes steps, features, means, instructions, or a BSS identifier for identifying a BSSID of the second BSS. Some examples further include steps, means, features, instructions, or a usage information communicator for communicating, via a backhaul communication, usage information pertaining to reduced versions of respective BSSIDs with at least one selected from the group consisting of a central controller and an AP of the second BSS, the communicating based at least in part on the identified BSSID of the second BSS. In some examples the communicating includes sending a request for the usage information of the second BSS to the at least one selected from the group consisting of the central controller and the access point of the second BSS. In some examples the communicating includes receiving the usage information of the second BSS from the at least one selected from the group consisting of the central controller or the access point of the second BSS.

In some examples of the method, communications devices, or non-transitory computer-readable medium, triggering the change from the same value includes steps, features, means, instructions, or an identifier value change requestor for sending a request to change from the same value to at least one selected from the group consisting of an AP associated with the first BSS and an AP associated with the second BSS.

In some examples of the method, communications devices, or non-transitory computer-readable medium, triggering the change from the same value includes steps, features, means, instructions, or a change request receiver for determining the change from the same value based at least in part on a request to change the reduced version of the BSSID for at least one of the first BSS or the second BSS.

Some examples of the method, communications devices, or non-transitory computer-readable medium includes steps, features, means, instructions, or a BSSID change announcer for transmitting an announcement of the change from the same value for stations served by at least one BSS associated with the change from the same value. In various examples the announcement includes one or both of a scheduled time for the triggered change or an indication of a transmission restriction mode.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

A wireless node may detect and resolve collisions in a reduced version of basic service set identifiers (BSSIDs). The collisions may be the result of multiple basic service sets (BSSs) using the same values for reduced versions of BSSIDs. For example, BSSs may use the same value for an X-bit color indicator of respective BSSIDs, where X may be a selected number of bits for the reduced version. A color collision may occur when the BSSs using the same color indicator are neighboring BSSs. When such a scenario occurs, the node may detect the collision by referencing usage information of a reduced versions of a BSSID from broadcast or backhaul communications with one of the involved BSSs. Alternatively, the node may determine that frames from two different BSSs include the same value for a reduced version of a BSSID (e.g., identical color indicators, etc.). The node may resolve the detected collision by triggering a change from the same value of the reduced version of the BSSID for one or both of the involved BSSs. For example, the node may send a request to an involved BSS that indicates that the BSS should change the respective value of the reduced version of the BSSID (e.g., a request to change color indicator). Alternatively, the node may autonomously change the value in the BSS with which the node is associated. In some cases, a device may transmit a value-change announcement to stations served by the BSS associated with the changing value of the reduced version of the BSSID.

Aspects of the disclosure are initially described in the context of a wireless communication system. Specific examples are then described with reference to BSSs that support a reduced version of BSSIDs. These and other aspects of the disclosure are further illustrated by and described with reference to apparatus diagrams, system diagrams, and flowcharts that relate to detection and resolution of a reduced version BSSID collision.

Figure 1:
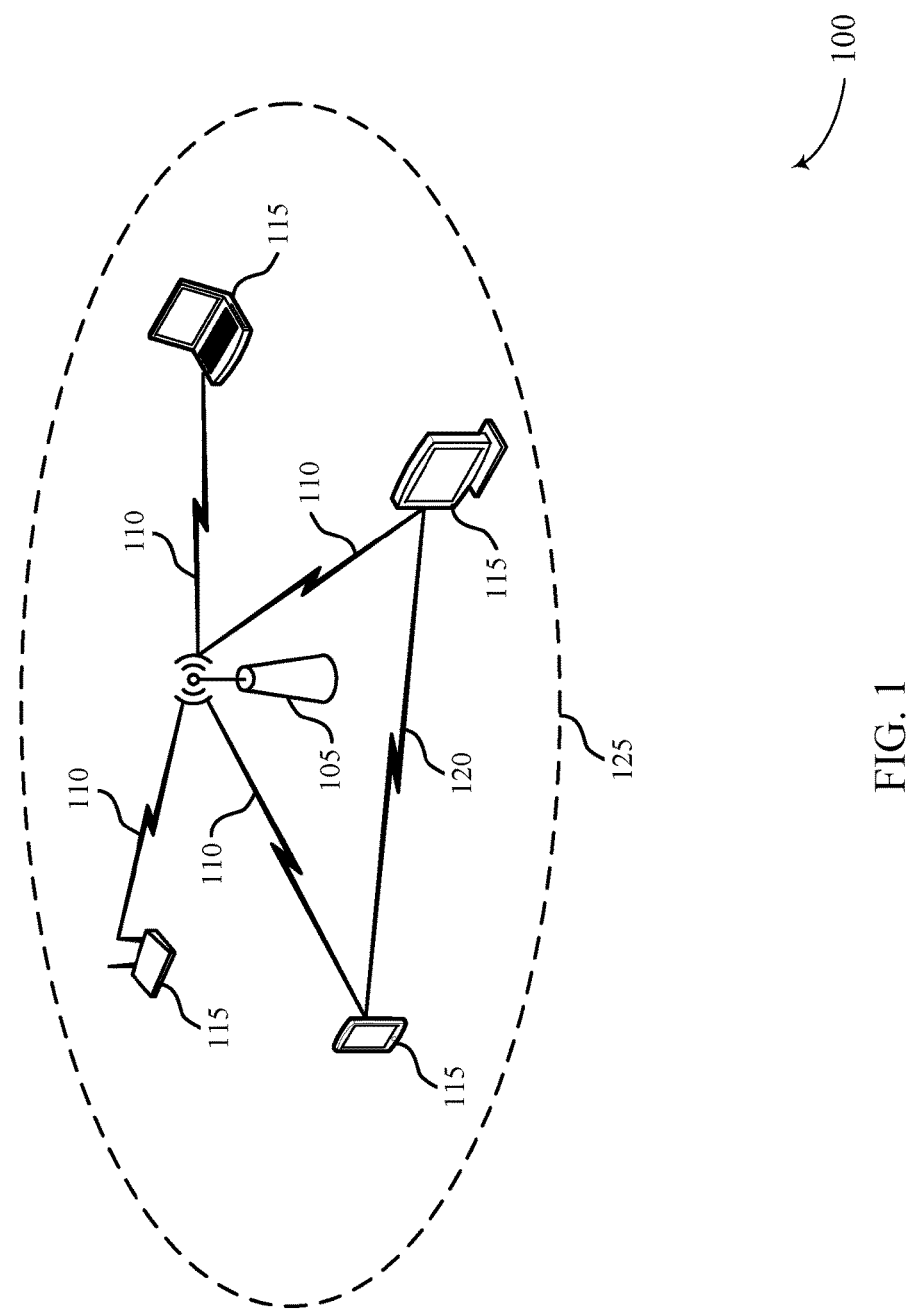
FIG. 1 illustrates a wireless local area network (WLAN) that supports detection and resolution of a reduced version BSSID collision configured in accordance with various aspects of the present disclosure.

FIG. 1 illustrates a wireless local area network (WLAN) 100 that supports detection and resolution of a reduced version BSSID collision in accordance with various aspects of the present disclosure. The WLAN 100 may include an access point (AP) 105 and multiple associated stations (STAs) 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a BSS or an extended service set (ESS). In a BSS a single AP 105 serves a number of STAs 115. An ESS is a set of two or more BSS that form a single subnetwork. The various STAs 115 in the network are able to communicate with one another through the AP 105. Also shown is a coverage area 125 of the AP 105, which may represent a basic service area (BSA) of the WLAN 100. An ESS associated with the WLAN 100 may be connected to a wired or wireless distribution system (DS) that may allow multiple APs 105 to be connected in an ESS.

Although not shown in FIG. 1, a STA 115 may be located in the intersection of more than one coverage area 125 and may associate with more than one AP 105. ADS (not shown)

may be used to connect APs 105 in an ESS. In some cases, the coverage area 125 of an AP 105 may be divided into sectors (also not shown). The WLAN 100 may include APs 105 of different types (e.g., metropolitan area, home network, etc.), with varying and overlapping coverage areas 125. Two STAs 115 may also communicate directly via a direct wireless link 120 regardless of whether both STAs 115 are in the same coverage area 125. In some case, the STAs 115 exchanges information via the direct wireless links 120 and relay the information to APs 105. Examples of direct wireless links 120 include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within WLAN 100.

A BSS may be uniquely identified from another BSS by a BSSID. A node within a BSS may include the BSSID in transmissions in order to distinguish them from transmissions of other BSSs. For example, the BSSID may be included in a beginning portion (e.g., the preamble) of a transmitted frame (e.g., the BSSID may be included in the signal (SIG) field of the PHY header of a frame) for reference by the receiving node. Accordingly, the receiving node (e.g., a STA) may decode the BSSID to determine if the communication is relevant (e.g., originates from a BSS with which the STA is associated). If the communication is relevant the node may continue to process the rest of the frame. However, if the communication is irrelevant (e.g., the frame is from an unassociated BSS) the node may ignore the remaining part of the frame (e.g., by entering a sleep mode). Additionally or alternatively, the node may transmit or receive other communications during a remaining portion of the frame. Thus, a node may decrease power consumption or increase throughput/efficiency by operating selectively during a remaining portion of a frame duration based at least in part on the BSSID of the frame.

WLAN 100 may reduce power consumption and increase throughput/efficiency by using shorter (e.g., smaller value) BSSIDs. For example, WLAN 100 may implement color bits (e.g., X-bit color indicators), which form a reduced version of the BSSID, and may be referred to as "colors". However, in some cases the same color bits may be used by neighboring BSSs. That is, there may be a collision of color bits, which may also be referred to as an overlap, or reuse of color bits. A color collision may refer to the scenario in which a node in a first BSS detects a frame from a node in a second BSS that has the same value of color bits as the first BSS. In such a scenario, a STA 115 located at the intersection of coverage areas 125 of the first and second BSSs may receive and process communications from both BSSs, regardless of association. For example, a STA associated with one of the BSSs may process frames from the other BSS upon detecting that the frames use the same color bits as the BSS with which the STA is associated.

Processing frames that are unintended and irrelevant may consume power and reduce communication efficiency for a STA 115. Accordingly, nodes in WLAN 100 may avoid unnecessary processing of irrelevant frames by detecting and resolving collisions of values of a reduced version of BSSIDs. For example, a node in WLAN 100 may detect that two BSSs are using the same value of a reduced version of a BSSID and direct one of the BSSs to the change the value used to identify that BSS. Although described with reference to two BSSs, the detection of collisions of reduced versions of BSSIDs and resolution techniques described herein may be implemented for any number of BSSs involved in such a collision.

Figure 2A:
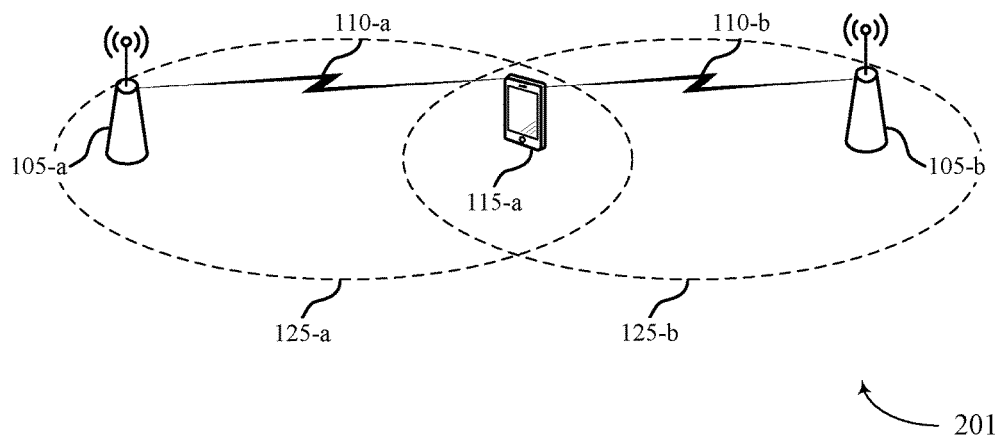
FIG. 2A illustrates an example of a wireless communications subsystem that supports detection and resolution of a reduced version BSSID collision in accordance with various aspects of the present disclosure.

FIG. 2A illustrates an example of a wireless communications subsystem 201 that supports detection and resolution of a reduced version BSSID collision in accordance with various aspects of the present disclosure. Wireless communications subsystem 201 may detect and resolve collisions that result from two neighbor BSSs using the same value for a reduced version of respective BSSIDs (e.g., when neighboring BSSs are using identical color bits). Wireless communications subsystem 201 includes a first BSS associated with AP 105-*a* and a second BSS associated with AP 105-*b*. AP 105-*a* serves STAs 115 within corresponding coverage area 125-*a* and AP 105-*b* serves STAs 115 within corresponding coverage area 125-*b*. The APs 105 and STAs 115 of wireless communications subsystem 201 may be examples of aspects of APs 105 and STAs 115 described with reference to FIG. 1. As shown in wireless communications subsystem 201, STA 115-*a* is located at the intersection of coverage areas 125-*a* and 125-*b*, and may receive communications from both AP 105-*a* and AP 105-*b*.

The BSSs of wireless communications subsystem 201 may use color bits as reduced versions of the respective BSSIDs. In one case, the BSS associated with AP 105-*b* may cause a color collision with the BSS associated with AP 105-*a* by selecting and using the same color bits as AP 105-*a*. Thus, when the STA 115-*a* is configured to use the reduced versions of a BSSID, frames sent over communication link 110-*a* and frames send over communication link 110-*b* may be interpreted as if they originate from a single BSS. Accordingly, STA 115-*a* may process frames from both AP 105-*a* and AP 105-*b* even if the frames are from a BSS unassociated with STA 115-*a*.

Thus, a collision may occur when two neighboring BSSs have overlapping coverage areas 125 and use the same value for a reduced versions of a BSSID. Such a scenario may be referred herein to as a "type 1" scenario. A STA 115 in a type 1 scenario may receive broadcasts from a neighbor AP 105 that include usage information for the reduced version of BSSIDs (e.g., color-use information). Based at least in part on the usage information, the STA 115, or associated AP 105, may detect the collision and trigger a change from a same value for the reduced version of the BSSID for one or both of the BSSs involved in the collision.

Figure 2B:
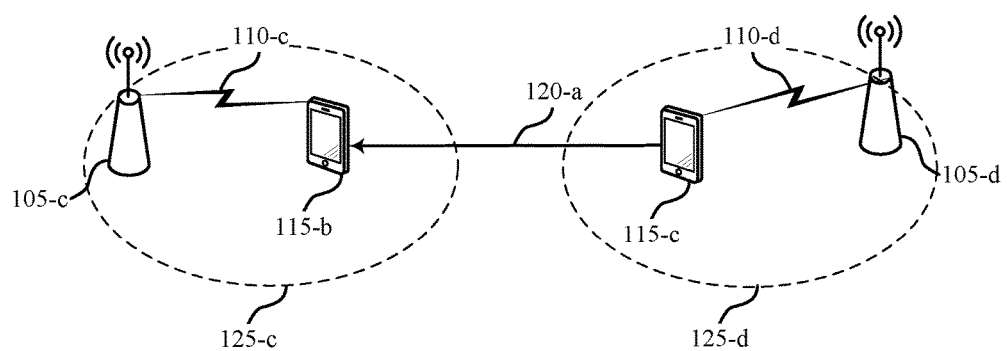
FIG. 2B illustrates an example of a wireless communications subsystem that supports detection and resolution of a reduced version BSSID collision in accordance with various aspects of the present disclosure.

FIG. 2B illustrates an example of a wireless communications subsystem 202 that supports detection and resolution of a reduced version BSSID collision in accordance with various aspects of the present disclosure. Wireless communications subsystem 202 may detect and resolve collisions that result from two neighbor BSSs using the same value for a reduced version of respective BSSIDs (e.g., when neighboring BSSs use identical color bits). Wireless communications subsystem 202 includes a first BSS associated with AP 105-*c* and a second BSS associated with AP 105-*d*. AP 105-*c* serves STAs 115 within corresponding coverage area 125-*c* (e.g., STA 115-*b*) and AP 105-*d* serves STAs 115 within corresponding coverage area 125-*d* (e.g., STA 115-*c*). The APs 105 and STAs 115 of wireless communications subsystem 202 may be examples of aspects of APs 105 and STAs 115 described with reference to FIG. 1.

The BSSs of wireless communications subsystem 202 may use reduced versions of BSSIDs to distinguish over other BSSs. For example, the BSSs may use X-bit color indicators in lieu of BSSIDs. In some cases, a collision may result from two neighboring BSSs using the same value for reduced versions of a BSSID for identification. For instance the BSS associated with AP 105-*c* may use the same color bits as the BSS associated with AP 105-*d*. Thus, frames sent over communication link 110-*c* and frames sent over communication link 110-*d* may appear as if they originate from a single BSS. In other words, a collision may still occur when two neighboring BSS have coverage areas 125 that do not overlap but use the same value for reduced versions of a BSSID. Such a scenario may be referred herein to as a "type 2" scenario. In such an scenario, the collision may be detected via communications between two STAs 115 within the different coverage areas. For example, STA 115-*c* may transmit (e.g., via direct wireless link 120-*a*) information to STA 115-*b* that indicates the color used by the BSS associated with AP 105-*d*. STA 115-*b* may leverage the information to independently recognize the color collision. Alternatively, STA 115-*b* may relay the color information to AP 105-*c* for detection of the color collision. Based at least in part on the detection, one of the BSSs associated with wireless communications subsystem 202 may change its value for reduced versions of BSSIDs (e.g., change a value of the color indicator).

Figure 3:
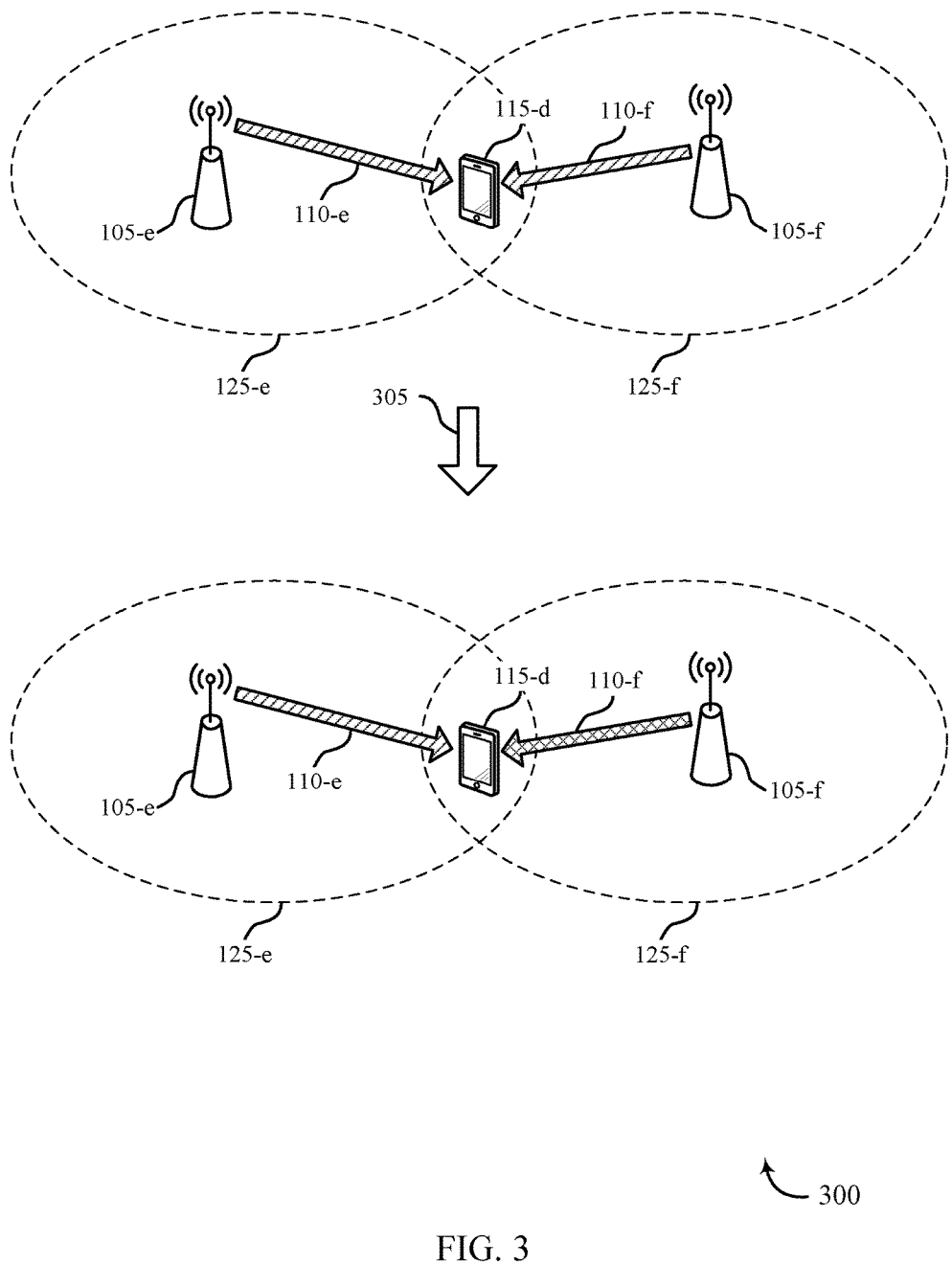
FIG. 3 illustrates an example of a wireless communications subsystem that supports detection and resolution of a reduced version BSSID collision in accordance with various aspects of the present disclosure.

FIG. 3 illustrates an example of a wireless communications subsystem 300 that supports detection and resolution of a reduced version BSSID collision in accordance with various aspects of the present disclosure. Wireless communications subsystem 300 may detect such collisions and resolve the collisions by changing from a same value of the reduced version of the BSSID (e.g., change a color indicator) for one of the involved BSSs. Wireless communications subsystem 300 includes two BSSs—a first BSS associated with AP 105-*e* and corresponding coverage area 125-*e* and a second BSS associated with AP 105-*f* and corresponding coverage area 125-*f*. Although shown with BSSs that have overlapping coverage areas 125 (e.g., a type 1 condition), the techniques described herein may be applied or implemented in a scenario in which neighboring BSSs have coverage areas that do not overlap (e.g., a type 2 condition).

The BSSs associated with AP 105-*e* and AP 105-*f* may use the same reduced version of respective BSSIDs (e.g., both AP 105-*e* and AP 105-*f* may use X-bit color indicators). In some examples, AP 105-*e* and AP 105-*f* have different BSSIDs but may be using a same value for the reduced version of the BSSIDs, which may decrease the ability of a STA 115 to distinguish between the two BSSs. For instance, STA 115-*d* may receive a communication via communication link 110-*e* that has the same value for the reduced version of a BSSID as a communication via communication link 110-*f*. STA 115-*d* may be associated with the BSS of AP 105-*e* and unassociated with AP 105-*f*; however, STA 115-*d* may still process frames from AP 105-*f* due to the collision.

A node in wireless communications subsystem 300 may detect and resolve the collision. The node may be an AP, such as AP 105-*e* or AP 105-*f*, or a STA, such as STA 115-*d*. The collision may be resolved by triggering a change from the same value for the reduced version of a BSSID used by one of the BSSs. For example, AP 105-*e* may detect the collision and instigate a change 305 for the BSS associated with AP 105-*f*, such as a change in a value for a color bit indicator. After the change 305 the BSS associated with AP 105-*f* may be associated with a different value of the reduced version of a BSSID than the value of the reduced version of a BSSID for the BSS of AP 105-*e*. For instance, frames transmitted over communication link 110-*f* may include a different color indicator than frames transmitted over communication link 110-*e*.

Whichever node detects the collision may also facilitate a resolution by determining which BSS should change from the same value of the reduced version of a BSSID. The BSS selected for the change in value may be associated with or unassociated with the detecting node. For example, AP 105-*e* may detect the collision and determine which BSS involved in the collision should change from the same value. The determination may be random. For instance, the node that detects the collision may compare time stamps of beacon signals from AP 105-*e* and AP 105-*f* and select which BSS should change based at least in part on the comparison (e.g., the BSS associated with the beacon with the later time stamp may be selected for the color change). In another scenario, there may be a pre-determination that the BSS associated with the detecting node should change from the same value. Alternatively, the BSS unassociated with the detecting node may be pre-determined to change from the same value. In some cases a node will detect the collision and another node will resolve the collision. For example, STA 115-*d* may detect the collision and report the collision to AP 105-*e* (or AP 105-*f*), which may then resolve the collision. The collision report may include information that the resolving node may utilize to determine which BSS should change values.

In certain examples, the decision to change values (e.g., the decision of which BSS should change colors) may be based at least in part on the full BSSID of the associated BSSs. For instance, the node responsible for resolving the collision may compare certain bits in the full BSSIDs for each involved BSS and select the BSS to change based at least in part on the comparison. In one example, the BSS corresponding to the BSSID with lower values of certain bits is selected for the change from the same value. In certain cases, the BSS selected for the change of value may be based at least in part on a setup time (e.g., how fast the BSS can implement a change in color bits) for each respective BSS involved in the collision. For example, the BSS with an earlier or shorter value setup time may be selected for the change. Alternatively, the BSS selected for the change of value may be chosen based at least in part on a quantity of unused values for each respective BSS (e.g., a quantity of unused colors). In one example, the BSS with more unused values is selected for the change. If neither BSS has unused values, each BSS may refrain from changing values (e.g., each BSS may keep the same value for the reduced version of BSSIDs).

In some cases, the values of the reduced version of a BSSID of neighboring BSSs uninvolved with the collision may play a role in a value-change decision. For instance, the BSS associated with AP 105-*f* may obtain colors bits for each neighboring BSS and determine a quantity of unused colors available to AP 105-*f* that would not result in a collision with one of the neighboring BSSs. An unused color that does not cause a collision with a neighboring BSS may be referred to as an available color. The node responsible for the resolution of the collision may compare the quantity of available colors for each BSS involved in the collision and select the BSS for change based at least in part on the comparison. In certain scenarios, the quantity of unused colors for a BSS and respective neighboring BSSs may play a role in the color-change decision. For instance, the quantity of unused colors for each BSS neighboring AP 105-*f* may be added to the quantity of unused colors for AP 105-*f*. This sum may be compared to a corresponding sum for AP 105-*e*. The node responsible for the resolution of the collision may select the BSS for change based at least in part on the comparison.

In certain aspects, the change from the same value may be based at least in part on the STAs 115 associated with the BSSs. For instance, a decision regarding which BSS should change colors may be based at least in part on the quantity of STAs 115 associated with each respective BSS, or the quantity of active STAs 115. In a certain scenario, the BSS with fewer associated STAs 115 is selected for the color change. Such a selection may result in less signaling (e.g., from the AP 105 to the associated STAs 115) to set up the color change. There may be times when the criteria for selecting the BSS to change are such that a tie occurs (e.g., the BSSs may both have the same quantity of associated STAs 115). In such an instance, a tie-breaker may be implemented. For instance, each AP 105 may broadcast a random number and the AP 105 with the larger number may be selected to change colors. The information described above may be reported from nodes within wireless communications subsystem 300 to the node responsible for the resolution of the collision. The reports may be in response to a request or independently transmitted.

If the BSS selected for the color change is associated with the AP 105 that detected the collision, the detecting AP 105 may autonomously make the chosen color change. In some cases, the AP 105 may transmit a color change announcement element (e.g., in a beacon, in a response to a probe, in a color change announcement frame, etc.) to STAs 115 associated with the corresponding BSS. The color change announcement may include an indication of the new color with which the BSS will be associated. The color change announcement may include an indication of a scheduled time for the color change to take place. For example, the announcement may indicate that the change will happen immediately after the end of the color announcement frame, or before the next X target beacon transmission times (TBTTs). Thus, the associated STAs 115 may know when to expect the color change. In certain aspects, the announcement may include a transmission restriction mode indicator that indicates whether the associated STAs 115 are allowed to transmit before the scheduled change time.

If the BSS selected to change color is not associated with the detecting AP 105, the detecting AP 105 may send a color change request to the AP 105 associated with the selected BSS. The color change request may indicate that the AP 105 associated with the selected BSS should change colors. For instance, in the present example, AP 105-*e* may detect the color collision and determine that AP 105-*f* and the corresponding BSS should change color (e.g., based at least in part on a criteria described above.) Accordingly, AP 105-*e* may transmit a color change request to AP 105-*f* which may trigger the change 305. In some cases, the color change request may include color change information (e.g., the color change request may indicate which color bits the changing AP 105 should use). In this or other examples, the color change request may include the color of the detecting AP 105, the color setup time of the detecting AP 105, the quantity of unused colors of the detecting AP 105, the quantity of STAs 115 associated with the detecting AP 105, or the quantity of active STAs 115 served by the detecting AP 105. The color change request may be sent to the neighbor AP 105 directly, via STA 115 relay, or via backhaul.

Figure 4:
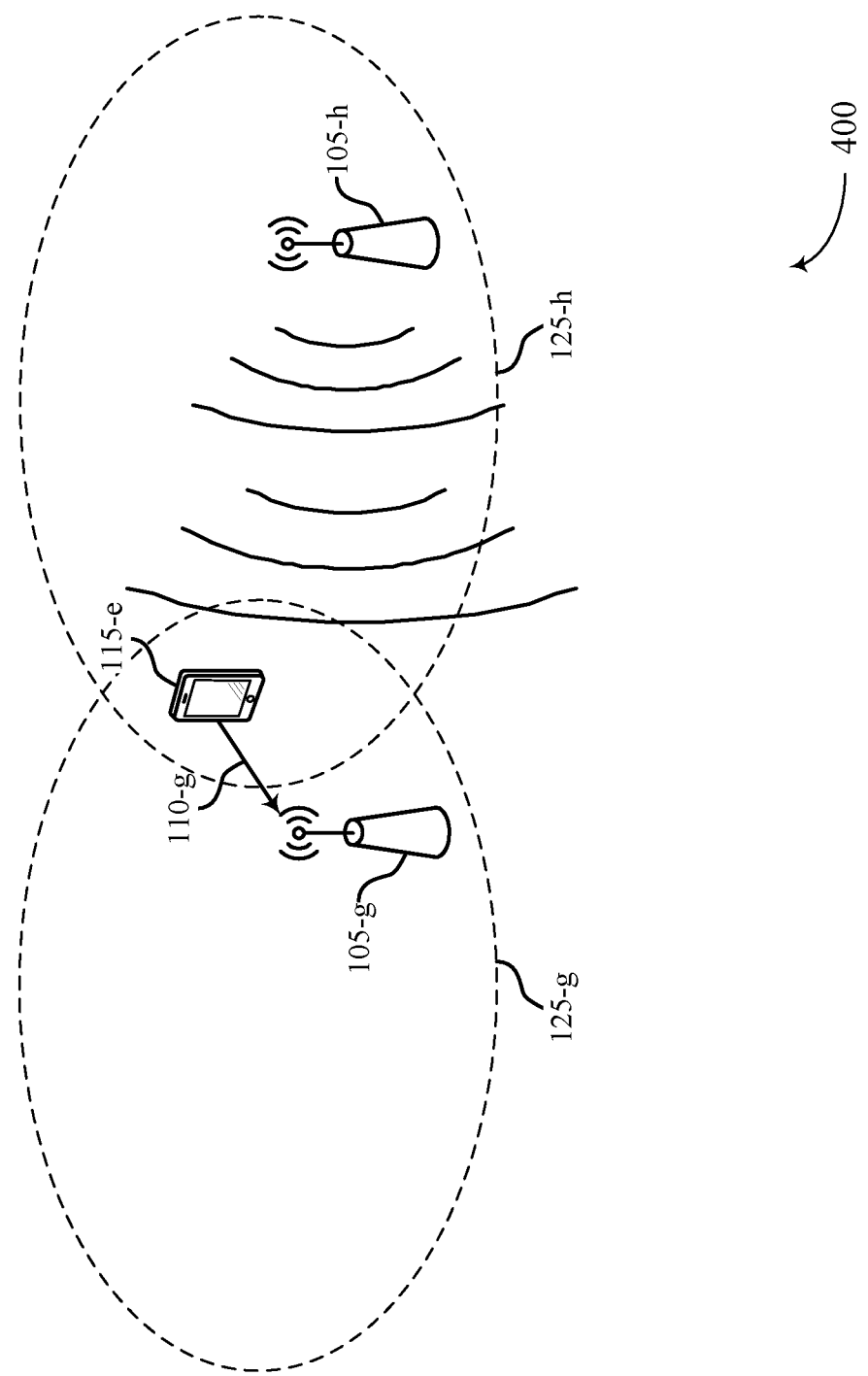
FIG. 4 illustrates an example of a wireless communications subsystem that supports detection and resolution of a reduced version BSSID collision in accordance with various aspects of the present disclosure.

FIG. 4 illustrates an example of a wireless communications subsystem 400 that supports detection and resolution of a reduced version BSSID collision in accordance with various aspects of the present disclosure. Wireless communications subsystem 400 may implement broadcast-based detection of such collisions. Wireless communications subsystem 400 includes two neighbor BSSs—a first BSS associated with AP 105-*g* and corresponding coverage area 125-*g* and a second BSS associated with AP 105-*h* and corresponding coverage area 125-*h*. Wireless communications subsystem 400 may utilize or leverage broadcasts from an AP 105 to detect a collision for type 1 conditions. Wireless communications subsystem 400 may rectify or resolve the collision by changing the value of the reduced version of BSSIDs for one of the BSSs such as described with respect to FIG. 3.

In the example of FIG. 4, AP 105-*h* may disseminate usage information for a reduced version of BSSIDs (e.g., a value of a color indicator used by AP 105-*h*) via broadcast. Some or all of the broadcast information may be received by STA 115-*e* and relayed to AP 105-*g* via communication link 110-*g*. The relay may be in response to a request from AP 105-*g*, AP 105-*h*, or independent of AP 105 intervention. The broadcast information may be transmitted without color bits so that any STA 115 within range of AP 105-*h* is able to receive the broadcast, including the STAs 115 unassociated with the BSS of AP 105-*h*. In certain scenarios, AP 105-*g* may send neighbor BSS information to STA 115-*e*. The information may enable the STA 115-*e* to selectively report broadcast color-use information for neighbor BSSs that are unknown to AP 105-*g*.

In an alternative, the broadcast information may be directly received by AP 105-*g*. For example, AP 105-*g* may be located such that broadcasts from AP 105-*h* reach AP 105-*g*. Regardless of how AP 105-*g* obtains the broadcast usage information, AP 105-*g* may utilize the usage information determine that there is a collision of values of the reduced version of BSSIDs. For example, the usage information may include the AP 105-*h* BSS color indicator. AP 105-*g* may compare the color indicator of AP 105-*h* with the color indicator of AP 105-*g* and determine that the two color indicators are the same (i.e., there is a color collision). Based at least in part on the color collision detection, AP 105-*g* may instigate a change in color bits. The change in color bits may be applicable to AP 105-*g* or to AP 105-*h*.

The usage information may include the used and unused values for the reduced version of BSSIDs (e.g., used and unused color indicators) for the BSS associated with AP 105-*h*. Based at least in part on this information, AP 105-*g* may select a value of the reduced version of BSSIDs for the change. The usage information broadcast by AP 105-*h* may include a setup time, such as an amount of time for AP 105-*h* to change color bits. The broadcast may also include the quantity of STAs 115 associated with AP 105-*h*, or the quantity of active STAs 115. AP 105-*g* may leverage the usage information to decide which BSS should change color, and which color should be substituted for the value associated with the collision. In some cases, the detection and resolution of the collision may all be handled by STA 115-*e*. Although described in terms of broadcast, usage information for a reduced version of BSSIDs may be communicated via multi-cast or uni-cast transmissions. For instance, AP 105-*h* may transmit usage information to a STA 115 with directions for the STA 115 to pass the information along to AP 105-*g*.

Figure 5:
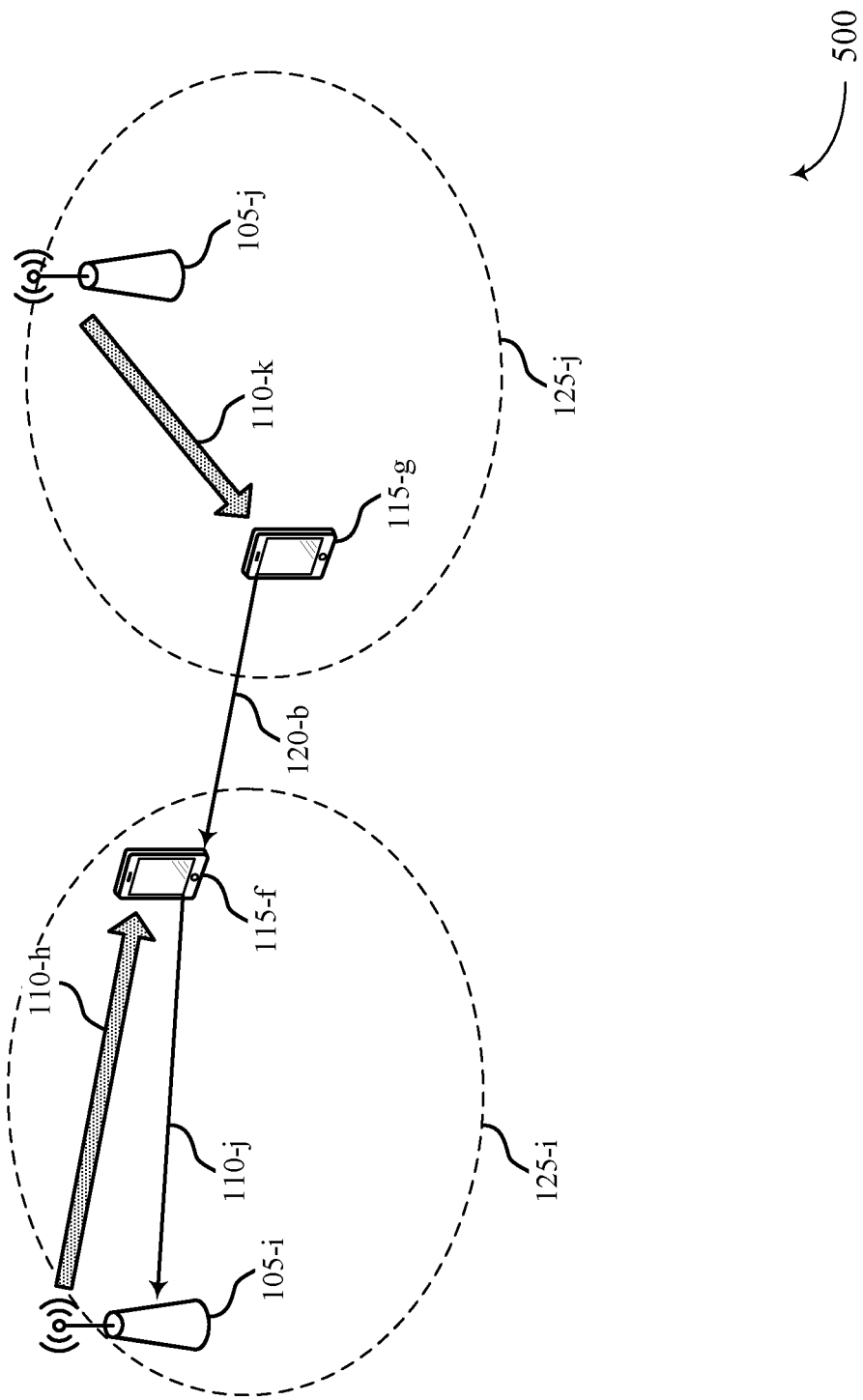
FIG. 5 illustrates an example of a wireless communications subsystem that supports detection and resolution of a reduced version BSSID collision in accordance with various aspects of the present disclosure.

FIG. 5 illustrates an example of a wireless communications subsystem 500 that supports detection and resolution of a reduced version BSSID collision in accordance with various aspects of the present disclosure. Wireless communications subsystem 500 may implement address-based detection of such collisions. Wireless communications subsystem 500 includes a first BSS associated with AP 105-*i*, STA 115-*f*, and corresponding coverage area 125-*i*. Wireless communications subsystem 500 includes a second BSS associated with AP 105-*r*, STA 115-*g* and corresponding coverage area 125-*j*. Wireless communications subsystem 500 represents a type 2 scenario in which the coverage areas 125 do not overlap; however, the techniques described herein may be applied to a type 1 scenario in which the coverage areas 125 overlap.

A collision may occur when AP 105-*i* and AP 105-*r* use a same value for identification reduced version of BSSIDs. For example, AP 105-*r* may transmit frames over communication link 110-*k* that include the same color bits as frames sent from AP 105-*i* over communication link 110-*h*. A node (e.g., STA 115-*f*) may detect a color collision by receiving frames from different BSSs with the same color bits. The frames may be received via broadcast, multi-cast, or uncast transmissions. For example, STA 115-*f* may receive frames from AP 105-*i* (e.g., via communication link 110-*h*) and STA 115-*g* (e.g., via direct wireless link 120-*b*) that have identical color values. STA 115-*f* may determine that the frames are from different BSSs by decoding and comparing the MAC addresses included in the frames. In one example, a node may identify the BSSID from the transmitter address in a downlink (DL) frame, or a receiver address in an uplink (UL) frame. Alternatively, the node may identify the BSS of a frame from transmitter/receiver addresses of known nodes in that BSS. If the detecting node is an AP 105 (e.g., AP 105-*i*), the AP 105 may autonomously trigger a color change for one of the BSSs. For example, the AP 105 may decide to alter the color bits of the BSS with which the AP 105 is associated. Alternatively, the AP 105 may send a color change request intended for the neighbor BSS.

If the detecting node is a STA 115 (e.g., STA 115-*f*) the STA 115 may either autonomously rectify the collision (e.g., by sending an explicit color change request) or report the collision to an AP 105 (e.g., via communication link 110-*j* with AP 105-*i*). That is, the detecting STA 115 may send a collision report to an AP 105 involved in the collision requesting action. In some cases, the collision report may be a single bit indicating that a collision occurred. The collision report may include information to assist in a decision to change from the same value at an AP 105. For example, the collision report may include neighbor BSS information such as the BSSID, a setup time, a quantity of unused colors, a quantity of STAs 115 associated with the neighbor BSS, a quantity of active STAs 115, or a random number (e.g., for tie-breaking). In some cases, the collision report or the change request may be relayed to an AP 105 via a STA 115 or AP 105 (e.g., via over the air (OTA) messages or backhaul messages). Regardless of which node detects the collision, the collision may be resolved utilizing the techniques described with reference to FIG. 3.

Figure 6:
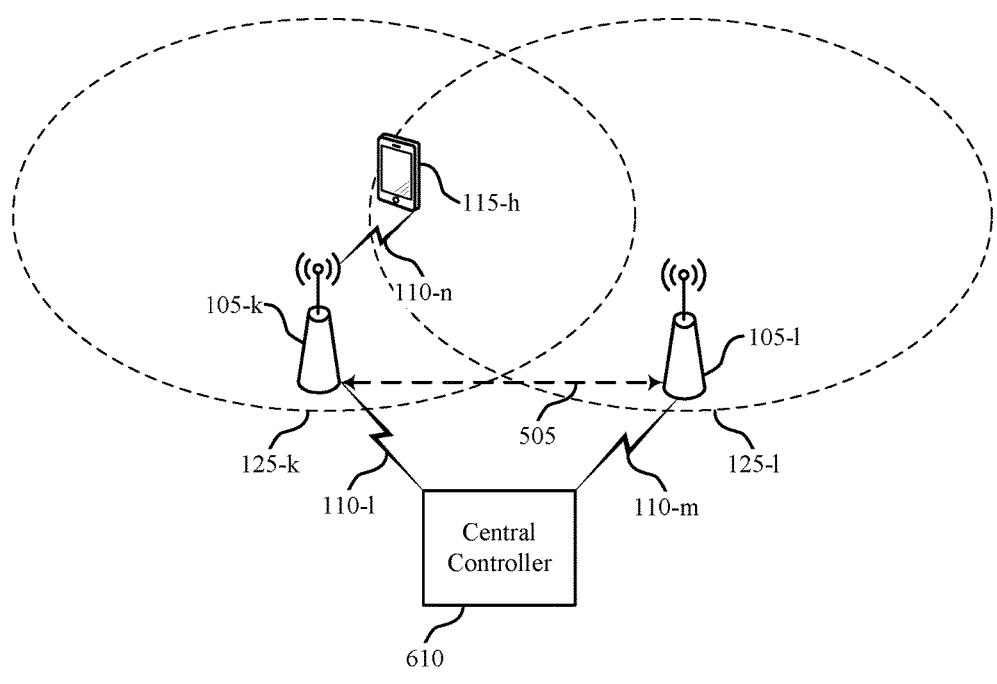
FIG. 6 illustrates an example of a wireless communications subsystem that supports detection and resolution of a reduced version BSSID collision in accordance with various aspects of the present disclosure.

FIG. 6 illustrates an example of a wireless communications subsystem 600 that supports detection and resolution of a reduced version BSSID collision in accordance with various aspects of the present disclosure. Wireless communications subsystem 600 may implement backhaul-based detection of such collisions. Wireless communications subsystem 600 includes a first BSS associated with AP 105-*k* and corresponding coverage area 125-*k*. Wireless communications subsystem 600 includes a second BSS associated with AP 105-*l* and corresponding coverage area 125-*l*. STA 115-*h* may be located at the intersection of coverage area 125-*k* and coverage area 125-*l*. Thus, wireless communications subsystem 600 represents a type 1 scenario; however, the techniques described herein may be applied to a type 2 scenario in which the coverage areas 125 do not overlap. The APs 105 and STAs 115 may be aspects of an AP 105 and STA 115, respectively, as described with reference to FIGS. 1-5.

An AP 105 may detect a collision of values of a reduced version of BSSIDs via backhaul communications with a neighbor AP 105 or a central controller 610. For instance, the AP 105 may determine the ID of a neighbor BSS and request (e.g., via backhaul link 505) usage information pertaining to that neighbor AP 105. The usage information may be communicated via backhaul link 505 from the neighbor AP 105, or via communication link 110-*l* from the central controller 610. Based at least in part on the usage information, the AP 105 may determine whether there is a collision and take appropriate steps to resolve the collision. In some cases, the AP 105 may send usage information to the contact node (e.g., AP 105-*l* or the central controller 610) and the contact node may detect and resolve the collision. In some cases, the central controller 610 may serve as a relay for messages between AP 105-*k* and AP 105-*l*. In other instances, the central controller 610 may coordinate collision detection and resolution independently. For example the central controller 610 may request/receive usage information from AP 105-*k* via communication link 110-*l* and AP 105-*l* via communication link 110-*m*. The central controller 610 may be another AP 105, the core network, or any intelligent communications device.

AP 105-*k* may obtain the ID of the BSS associated with AP 105-*l* via communications with the AP 105-*l* (e.g., intercepted broadcasts) or STA 115-*h* (e.g., via communication link 110-*n*). For example, AP 105-*k* may determine the ID via detection of the BSSID of AP 105-*l* via a broadcast from AP 105-*l*. Alternatively, AP 105-*k* may receive the identification of the BSS associated with AP 105-*l* directly from STA 115-*h* or central controller 610. For example, AP 105-*k* may obtain the identification information of AP 105-*l* during a hand-in report from STA 115-*h* (e.g., in a re-association request). Regardless of how AP 105-*k* receives the BSS identification information to detect the collision, the resolution of the collision may be implemented using any of the techniques described with reference to FIG. 3.

Figure 7:
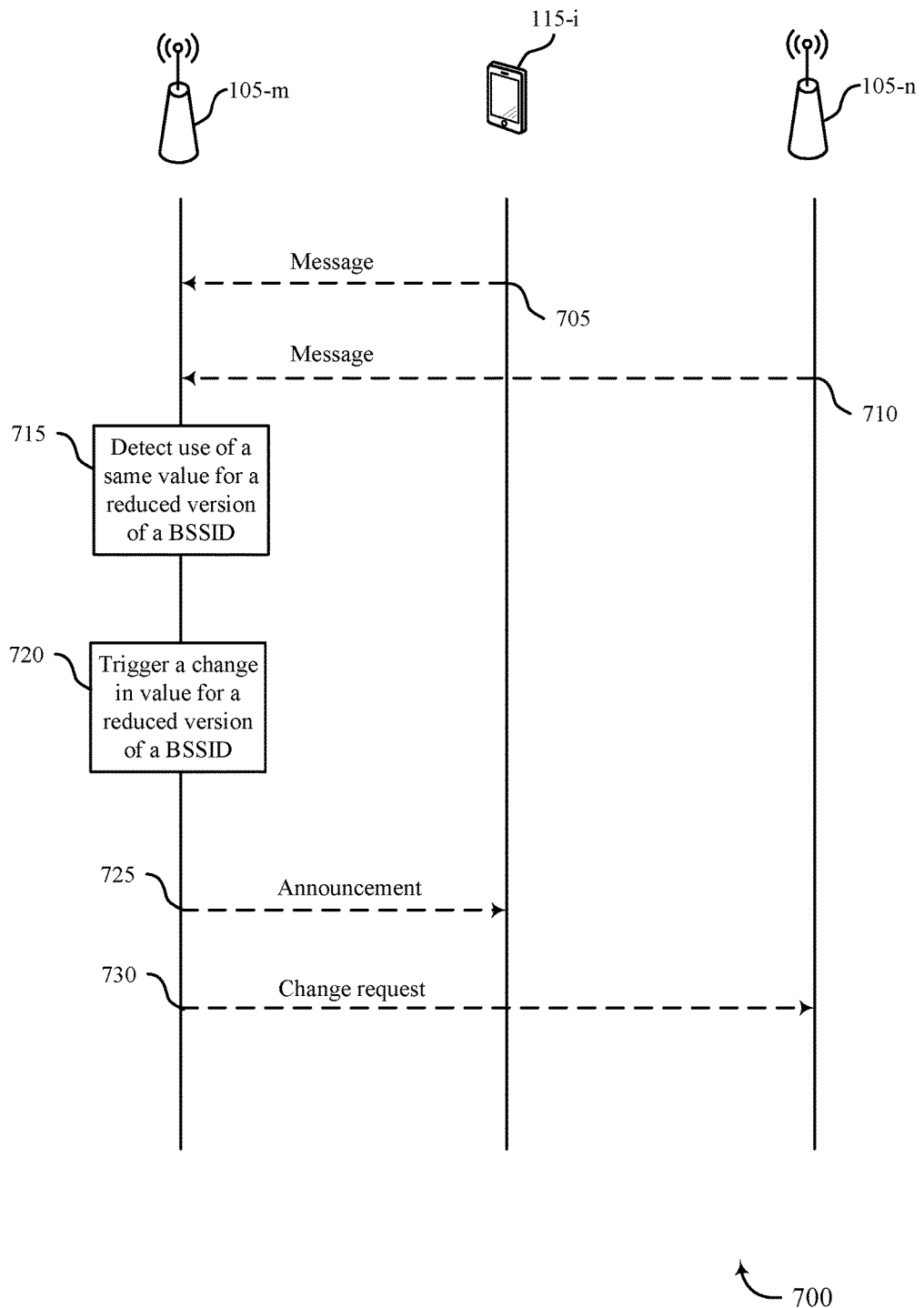
FIG. 7 illustrates an example of a process flow that supports detection and resolution of a reduced version BSSID collision in accordance with various aspects of the present disclosure.

FIG. 7 illustrates an example of a process flow 700 that supports detection and resolution of a reduced version BSSID collision in accordance with various aspects of the present disclosure. Process flow 700 may include AP 105-*m*, AP 105-*n*, and STA 115-*i*, which may be examples of an AP 105 and STA 115 described with reference to FIGS. 1-6. AP 105-*m* may be associated with a first BSS and AP 105-*n* may be associated with a second BSS.

At 705, STA 115-*i* may transmit, and AP 105-*m* may receive, a message indicating a value for a reduced version of BSSID (e.g., an X-bit color indicator) used by the BSS associated with AP 105-*n* (i.e., the second BSS). The message may be in response to a query or request from AP 105-*m*. The message may relay color or reduced version BSSID information for AP 105-*n* such as a setup time for reduced versions of BSSIDs or a quantity of unused values for reduced versions of BSSIDs of AP 105-*n* and BSSs that neighbor AP 105-*n*. In some cases, the message may include a quantity of STAs 115 associated with AP 105-*n*, or a quantity of active STAs 115. The message may include the BSSID of AP 105-*n*. Additionally or alternatively, at 710 AP 105-*n* may broadcast, and AP 105-*m* may receive, the value of the reduced version of BSSID used by AP 105-*n* (e.g., the color bits of AP 105-*n*). In some cases the broadcast may include information related to the reduced version of BSSID.

At 715, AP 105-*m* may detect that the first BSS and the second BSS are using a same value for reduced versions of respective BSSIDs. For example, each BSS may be using the same color bits. The detection may be based at least in part on messages received from STA 115-*i* or AP 105-*n*. For instance, detecting may include receiving the broadcast communication from AP 105-*n* of the second BSS. In such an instance, AP 105-*m* may compare the received broadcast information to corresponding information of the first BSS to detect the reuse (i.e., collision) of the value for reduced version of BSSID. Or, detecting may include receiving from STA 115-*i* the color value for the second BSS, the color value for the second BSS having been received at STA 115-*i* via a broadcast communication from AP 105-*n*.

In some examples, a node (e.g., STA 115-*i* or AP 105-*m*) detects the use of the same color value by the two BSSs by receiving a first frame from the first BSS (e.g., from AP 105-*m*) and a second frame from the second BSS (e.g., from AP 105-*n*). The node may determine that the first frame and the second frame have the same value for reduced versions of respective BSSIDs (i.e., the frames include the same color bits). In some cases, the node may identify a MAC address of the first BSS in the first frame and a MAC address of the second BSS in the second frame. The node may determine that the frames are from two different BSSs based at least in part on the MAC addresses of the respective frames.

In certain aspects, AP 105-*m* may communicate, via backhaul, usage information pertaining to reduced versions of respective BSSIDs (e.g., color-use information) with a central controller or AP 105-*n*. AP 105-*m* may communicate with AP 105-*n* based at least in part on the BSSID of the second BSS. In some examples communicating includes sending a request to the central controller (or AP 105-*n*) for the usage information of the second BSS. In certain cases, communicating includes receiving from the central controller (or AP 105-*n*) usage information of the second BSS. Communicating may include transmitting usage information of the first BSS to the central controller (or AP 105-*n*).

At 720, AP 105-*m* may trigger, based at least in part on the detection, a change from the same value for a reduced version BSSID. For example, AP 105-*m* may trigger a change in color bits for one of the BSSs. The change in value may be for the BSS associated with AP 105-*m* (the first BSS) or for the BSS associated with AP 105-*n* (the second BSS). That is, triggering may include determining at least one of the first BSS and the second BSS to change values for reduced versions of respective BSSIDs. In some examples triggering includes determining a new value for a reduced version of a BSSID that is not in use by the first BSS and the second BSS. Determining the new value may include determining that the new value for the reduced version of the BSSID is not in use by neighboring BSSs other than the first BSS and the second BSS. In certain aspects, triggering includes determining a value for a reduced version of a BSSID that is not in use by a neighbor BSS. In such a scenario, the change in the value is based at least in part on the value for the reduced version of the BSSID that is not in use by the neighbor BSS. In some cases, AP 105-*m* may determine, based at least in part on the identification of MAC addresses in a first and second frame, that the first frame and the second frame are from different BSSs and trigger that change based at least in part on that determination. In some examples, AP 105-*m* autonomously determines the change in the value.

In some cases, STA 115-*i* may detect the same value for reduced versions of BSSIDs and trigger the change from the same value. For example STA 115-*i* may send a collision report to AP 105-*m* indicating that the first BSS and the second BSS have the same value for reduced versions of respective BSSIDs (e.g., the first and second BSS use identical color bits). In some examples, STA 115-*i* sends the collision report to AP 105-*m* at 705. At 725, AP 105-*m* may transmit an announcement of the change from the same value to STA of the BSS whose value has changed. For example, AP 105-*m* may send an color change announcement to STA 115-*i*. In some examples, the announcement includes a scheduled change time. In certain aspects, the announcement includes an indication of a transmission restriction mode. The announcement may include the value of the reduced version of the BSSID with which the changing BSS will be associated with after the change.

Alternatively, at 730, AP 105-*m* may send a request to the BSS selected to change value for the reduced version of the BSSID. For example, AP 105-*m* may send a change request to AP 105-*n* indicating that AP 105-*n* should change color bits. In such an example, AP 105-*n* may trigger the change in value based at least in part on a request to change from AP 105-*m*. Thus, a collision of values for reduced versions of BSSIDs may be detected and resolved.

Figure 8:
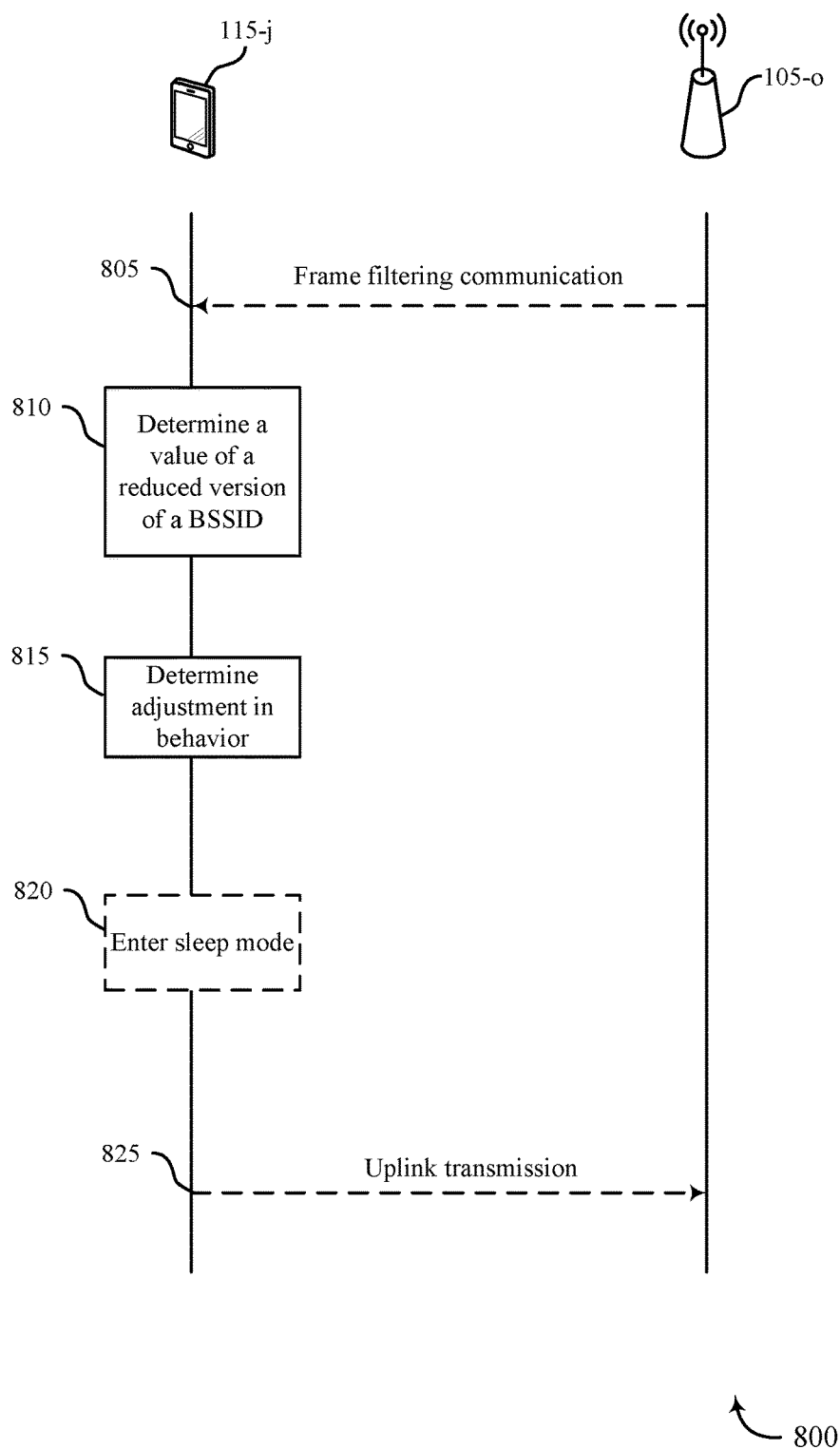
FIG. 8 illustrates an example of a process flow that supports detection and resolution of a reduced version BSSID collision in accordance with various aspects of the present disclosure.

FIG. 8 illustrates an example of a process flow 800 that supports detection and resolution of a reduced version BSSID collision in accordance with various aspects of the present disclosure. Process flow 800 may include STA 115-*j* and AP 105-*o*, which may be examples of a STA 115 and AP 105 described with reference to FIGS. 1-7. STA 115-*j* may support frame filtering in which frames are processed or ignored based at least in part on the value of the reduced version of the BSSID included in the frame. For example, STA 115-*j* may decode the reduced version of the BSSID (e.g., the X-bit color indicator) in the beginning portion of a frame to determine with which BSS the frame is associated. If the frame is associated with a BSS with which STA 115-*j* is unassociated or does not belong (e.g., an overlapping BSS (OBSS)), STA 115-*j* may use a remaining portion of the frame to transmit; that is, the STA 115-*j* may transmit over the remaining portion of the received frame.

In some cases, an AP 105 may not support frame filtering that is based at least in part on the reduced versions of BSSIDs (e.g., the AP 105 may not support color-based frame filtering). In such a scenario, a STA 115 that uses such frame filtering may attempt to transmit concurrently with a received frame to the AP 105. However, the AP 105 may not be able to receive the frame due to priority given to the received frame. Thus, the STA 115 may consume power transmitting frames that are not received at the AP 105. Thus, a STA 115 may modify behavior based at least in part on the ability of an AP 105 to support color-based frame filtering.

At 805, STA 115-*j* may receive a communication from AP 105-*o* indicating whether AP 105-*o* supports frame filtering that is based at least in part on values of reduced versions of BSSIDs (e.g., color-based frame filtering). At 810, STA 115-*j* may determine the value of a reduced version of BSSID (e.g., the color bits) for a received frame. The frame may include a reduced version of BSSID that is unassociated with STA 115-*j*. Accordingly, at 815, STA 115-*j* may determine an adjustment in behavior based at least in part on the frame filtering communication from AP 105-*o*. For example, if AP 105-*o* doesn't support frame filtering STA 115-*j* may enter a sleep mode at 820 for a remaining portion of the received frame. Alternatively, if AP 105-*o* does support frame filtering, STA 115-*j* may transmit during a remaining portion of the received frame to AP 105-*o*. For example, STA 115-*j* may send a transmission to AP 105-*o* at 825. In some cases, STA 115-*j* may prioritize APs 105 based at least in part on their ability to support frame filtering. For example, an AP 105 that supports frame filtering may be given higher priority that an AP 105 that does not support frame filtering. In some cases, upon determining that AP 105-*o* does not support frame filtering, STA 115-*j* may transmit to another AP 105 (e.g., one that does support frame filtering) instead of entering a sleep mode.

Figure 9:
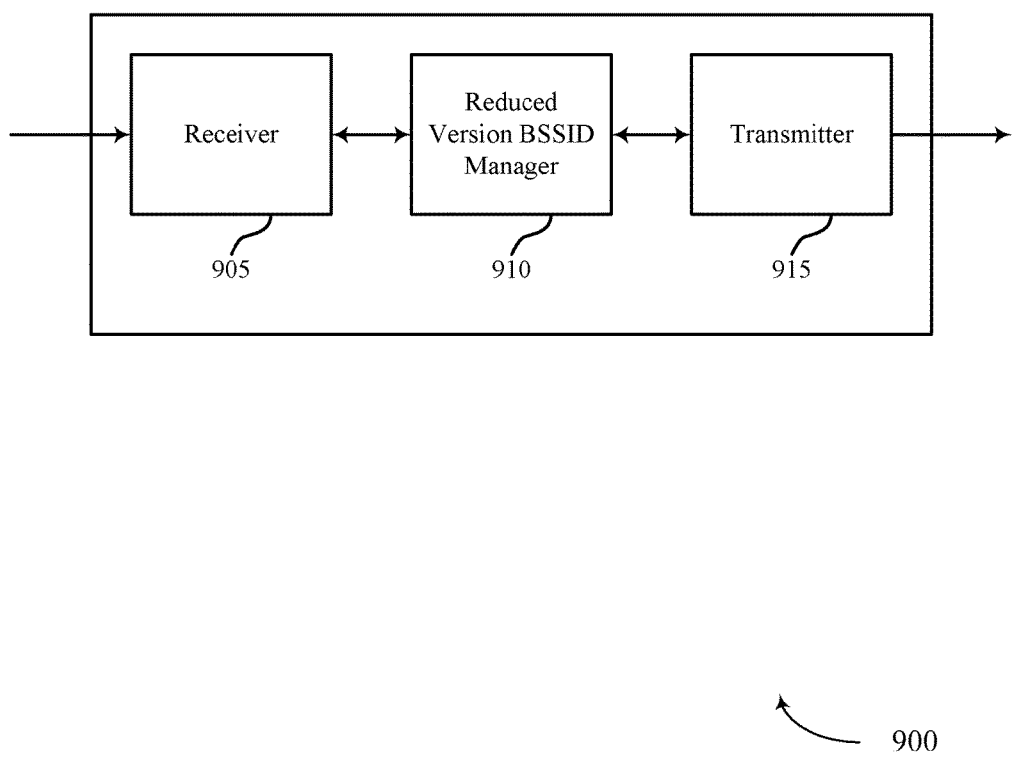
FIG. 9 shows a block diagram of a device that supports detection and resolution of a reduced version BSSID collision in accordance with various aspects of the present disclosure.

FIG. 9 shows a block diagram of a wireless device 900 that supports detection and resolution of a reduced version BSSID collision in accordance with various aspects of the present disclosure. Wireless device 900 may be an example of aspects of an AP 105 or a STA 115 described with reference to FIGS. 1-8. Wireless device 900 may include a receiver 905, a reduced version BSSID manager 910, and a transmitter 915. Wireless device 900 may also include a processor. Each of these components may be in communication with each other.

The receiver 905 may receive information such as packets, user data, or control information associated with various information channels (e.g., control channels, data channels, and information related to detection and resolution of a reduced version BSSID collision, etc.). The received packets may include values for reduced versions of BSSIDs (e.g., color bits). The received information may be passed on to the reduced version BSSID manager 910, and to other components of wireless device 900.

The reduced version BSSID manager 910 may detect that a first BSS and a second BSS are using a same value (e.g., a same value for a X-bit color indicator) for reduced versions of respective BSSIDs, and trigger, based at least in part on the detection, a change from the same value for at least one of the first BSS and the second BSS. Detecting may include receiving a broadcast communication from an AP of the second BSS that includes the value (e.g., color) for the second BSS. Detecting may include receiving, from a STA associated with the first BSS, the value for the second BSS. The value for the second BSS may have been received at the STA associated with the first BSS via a broadcast communication from an AP of the second BSS. In certain aspects, detecting includes receiving a first frame from the first BSS and a second frame from the second BSS and determining that the first frame and the second frame have the same value for reduced versions of respective BSSIDs (e.g., the frames have identical color bits but originate from different BSSs).

In some cases, triggering may include determining a new value for a reduced version of a BSSID that is not in use by the first BSS and the second BSS. That is, the reduced version BSSID manager 910 may determine which colors are not in use by either of the BSSs involved in the collision. The change in the value may be based at least in part on the value for the reduced version of the BSSID that is not in use by the changing BSS or associated neighbor BSSs. In certain examples, triggering includes determining a new value for a reduced version of a BSSID that is not in use by a neighbor BSS. For example, the reduced version BSSID manager 910 may determine the unused colors for neighboring BSSs that are not involved in a color collision. The first BSS and the second BSS may be neighbor BSSs. The change in the value may be based at least in part on the value for the reduced version of the BSSID that is not in use by the neighboring BSSs. In certain aspects, triggering may involve receiving a broadcast communication that includes information associated with an AP of the second BSS. In such a scenario, the information may include a setup time for reduced versions of BSSIDs (e.g., a color setup time), a quantity of unused values for reduced versions of BSSIDs of the second BSS and BSSs that neighbor the second BSS, a quantity of associated STAs, and a quantity of active STAs. The reduced version BSSID manager 910 may compare the received broadcast information to corresponding information of the first BSS and trigger the change based at least in part on the comparison, such as described with reference to FIG. 3.

The transmitter 915 may transmit signals received from other components of wireless device 900. In some examples, the transmitter 915 is collocated with the receiver 905 in a transceiver. The transmitter 915 may include a single antenna, or it may include a plurality of antennas.

Figure 10:
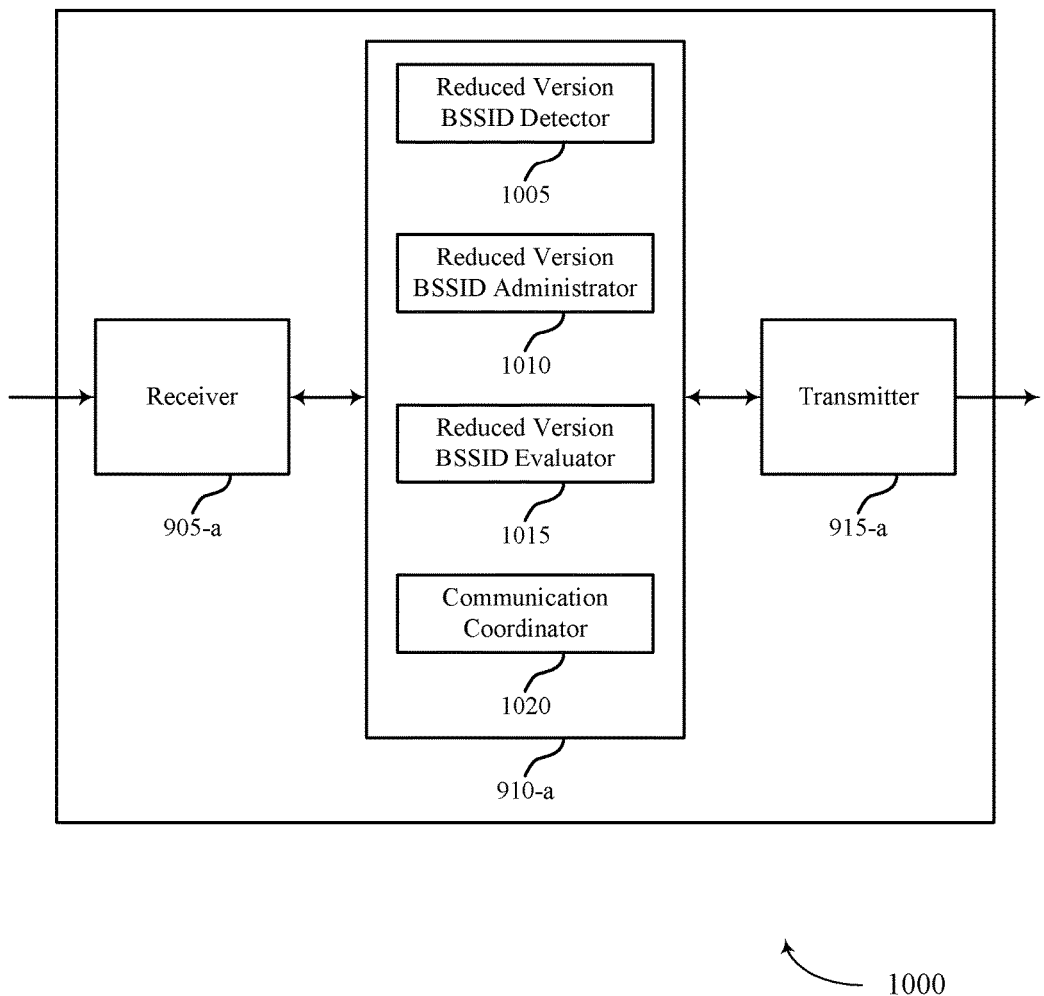
FIG. 10 shows a block diagram of a device that supports detection and resolution of a reduced version BSSID collision in accordance with various aspects of the present disclosure.

FIG. 10 shows a block diagram of a wireless device 1000 that supports detection and resolution of a reduced version BSSID collision in accordance with various aspects of the present disclosure. Wireless device 1000 may be an example of aspects of a wireless device 900 described with reference to FIG. 9. Wireless device 1000 may include a receiver 905-*a*, a reduced version BSSID manager 910-*a*, and a transmitter 915-*a*. Wireless device 1000 may also include a processor. Each of these components may be in communication with each other. The reduced version BSSID manager 910-*a* may be an example of the reduced version BSSID manager 910 described with reference to FIG. 9. The reduced version BSSID manager 910-*a* may include a reduced version BSSID detector 1005, a reduced version BSSID administrator 1010, a reduced version BSSID evaluator 1015, and a communication coordinator 1020.

The receiver 905-*a* may receive information which may be passed on to the reduced version BSSID manager 910-*a*, and to other components of wireless device 1000. The reduced version BSSID manager 910-*a* may perform the operations described with reference to FIG. 9. The transmitter 915-*a* may transmit signals received from other components of wireless device 1000.

The reduced version BSSID detector 1005 may detect that a first BSS and a second BSS are using a same value for reduced versions of respective BSSIDs as described with reference to FIGS. 2A-8. That is, the reduced version BSSID detector 1005 may detect a collision of values for a reduced version of BSSIDs between two BSSs. In some examples, detecting includes receiving a broadcast communication from an AP of the second BSS that includes the value for the second BSS. In some examples, detecting includes receiving from a STA associated with the first BSS the value for the second BSS, the value for the second BSS having been received at the STA via a broadcast communication from an AP of the second BSS. The reduced version BSSID detector 1005 may also determine that a first frame and a second frame sent from different BSSs have the same value for reduced versions of respective BSSIDs.

The reduced version BSSID detector 1005 may also adjust a behavior of the wireless device 1000. The adjustment may be based at least in part on a communication from an AP indicating the capability of the AP to support frame filtering that is based at least in part on values of reduced versions of BSSIDs. The adjustment may be with respect to an AP when a frame is detected using a value of a reduced version of a BSSID of a neighboring BSS with which the node is not associated. That is, the frame may include color bits that do not correspond to a BSS with which the node is associated. The value (e.g., color bits) may be in a first portion of the frame. In some examples, adjusting the behavior includes entering a sleep mode in a second portion of the frame when the communication indicates that the AP does not support frame filtering based at least in part on values of reduced versions of BSSIDs. In some examples, adjusting the behavior includes transmitting during a second portion of the frame when the communication indicates that the AP supports frame filtering based at least in part on values of reduced versions of BSSIDs.

The reduced version BSSID administrator 1010 may trigger, based at least in part on the detection of a collision, a change from the same value for at least one of the first BSS and the second BSS as described with reference to FIGS. 2A-8. In some examples, triggering includes determining at least one of the first BSS and the second BSS to change values for reduced versions of respective BSSIDs (e.g., determining which involved BSS should change colors). In some examples, triggering includes determining the change in the value based at least in part on a request to change from the same value of the reduced version of the BSSID for at least one of the first BSS and the second BSS. In some examples, triggering includes autonomously determining the change in the value.

The reduced version BSSID evaluator 1015 may be configured such that triggering may include determining a new value for a reduced version of a BSSID that is not in use by the first BSS and the second BSS. That is, the reduced version BSSID evaluator 1015 may determine which values are unused by which BSSs. The change in the value may be based at least in part on the new value for the reduced version of the BSSID that is not in use by the changing BSS or associated neighbor BSSs as described with reference to FIGS. 2A-8. In some examples, triggering includes determining a new value for a reduced version of a BSSID that is not in use by a neighbor BSS (the first BSS and the second BSS being neighbor BSSs). In other words, triggering may involve determining a color that is unused by surrounding BSSs. Accordingly, the change from the same value may be based at least in part on the new value for the reduced version of the BSSID that may is not in use by the neighbor BSSs. The reduced version BSSID evaluator 1015 may also compare received broadcast information to corresponding information of the first BSS. Triggering the change may be based at least in part on the comparison. The reduced version BSSID evaluator 1015 may also determine, based at least in part on identification of MAC address for a first and second frame that the first frame and the second frame are from different BSSs. Accordingly, the change may be based at least in part on the determination.

The communication coordinator 1020 may be configured to facilitate receiving a broadcast communication that includes information associated with an AP of the second BSS. The information may include a setup time for reduced versions of BSSIDs (e.g., a color setup time), the quantity of unused values for reduced versions of BSSIDs of the second BSS and BSSs that neighbor the second BSS, the quantity of associated STAs, and the quantity of active STAs as described with reference to FIGS. 2A-8. In some examples, the communication coordinator 1020, in conjunction with the receiver 905-*a*, receives a first frame from the first BSS and a second frame from the second BSS. The first and second frames may originate from different BSSs but include the same color bits. In some examples, the communication coordinator 1020 may, in conjunction with the transmitter 915-*a*, send a collision report to an AP that indicates that the first BSS and the second BSS have the same value for reduced versions of respective BSSIDs. The communication coordinator 1020 may also facilitate backhaul communications of usage information (e.g., color-use information) pertaining to reduced versions of respective BSSIDs with at least one of a central controller and an AP of the second BSS based at least in part on the BSSID of the second BSS.

In some examples, the communication coordinator 1020 facilitates transmission of a request to a central controller (or an AP of the second BSS) for the usage information of the second BSS. The communication coordinator 1020 may facilitate receiving from the central controller (or the AP of the second BSS) the usage information of the second BSS. The communication coordinator 1020 may also facilitate sending a request to the determined BSSs to change respective values for reduced versions of the BSSIDs. The communication coordinator 1020 may also facilitate transmitting an announcement of the change in the value to STAs of the BSS whose value has changed. In some examples, the announcement includes a scheduled change time. In some examples, the announcement includes an indication of a transmission restriction mode. The communication coordinator 1020 may, in conjunction with receiver 905-*a*, receive a communication from an AP indicating whether the AP supports frame filtering based at least in part on values of reduced versions of BSSIDs.

The components of wireless device 1000, wireless device 900, and reduced version BSSID manager 910 may, individually or collectively, be implemented with at least one application specific integrated circuit (ASIC) adapted to implement some or all of the applicable features in hardware. Alternatively, the features may be implemented by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The features of each unit may also be implemented, in whole or in part, with instructions embodied in a memory, formatted to be executed by one or more general or application-specific processors.

Figure 11A:
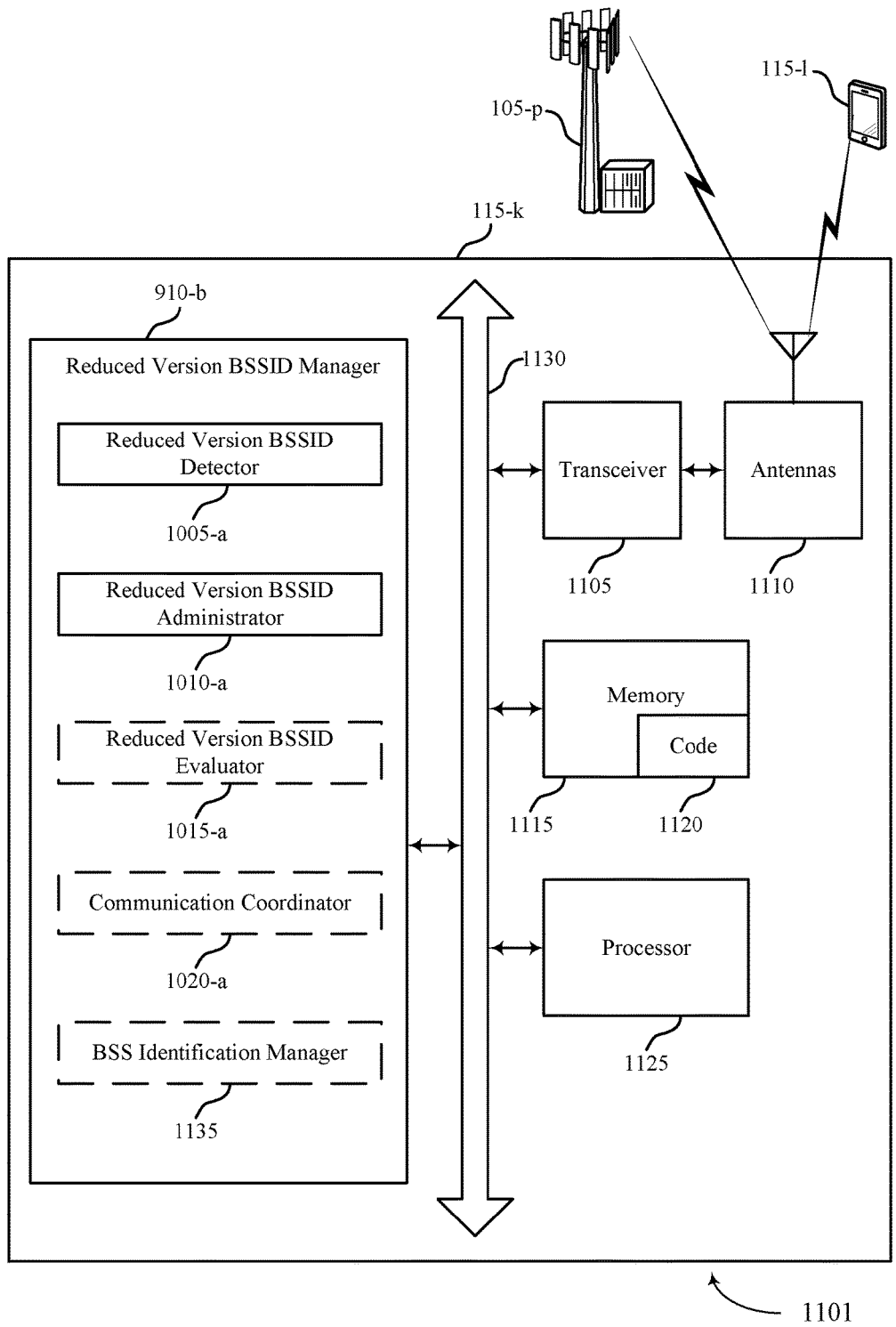
FIG. 11A illustrates a block diagram of a system including a station that supports detection and resolution of a reduced version BSSID collision in accordance with various aspects of the present disclosure.

FIG. 11A illustrates a block diagram 1101 including a STA 115-*k* that supports detection and resolution of a reduced version BSSID collision in accordance with various aspects of the present disclosure. STA 115-*k* may be an example of a wireless device 900, 1000, or STA 115 describe herein, and with reference to FIGS. 1-10. STA 115-*k* may include a reduced version BSSID manager 910-*b*, which may be an example of a reduced version BSSID manager 910 or 910-*a* described with reference to FIGS. 9 and 10. STA 115-*k* may also include components for bi-directional voice and data communications including components for transmitting communications and components for receiving communications. For example, STA 115-*k* may communicate bi-directionally with AP 105-*p* or STA 115-*l*. STA 115-*k* may also include a processor 1125, and memory 1115 (including software/firmware code 1120), a transceiver 1105, and one or more antennas 1110, each of which may communicate, directly or indirectly, with one another (e.g., via buses 1130). The transceiver 1105 may communicate bi-directionally, via the antennas 1110 or wired or wireless links, with one or more networks, as described above. The transceiver 1105 may include a modem to modulate the packets and provide the modulated packets to the antennas 1110 for transmission, and to demodulate packets received from the antennas 1110. While STA 115-*k* may include a single antenna 1110, STA 115-*k* may also have multiple antennas 1110 capable of concurrently transmitting or receiving multiple wireless transmissions.

The components of the reduced version BSSID manager 910-*b* may, individually or collectively, be implemented with at least one ASIC adapted to implement some or all of the applicable features in hardware. Alternatively, the features may be implemented by one or more other processing units (or cores), on at least one integrated circuit (IC). In other examples, other types of integrated circuits may be used (e.g., Structured/Platform ASICs, an FPGA, or another semi-custom IC), which may be programmed in any manner known in the art. The features of each unit may also be implemented, in whole or in part, with instructions embodied in a memory, formatted to be executed by one or more general or application-specific processors.

STA 115-$k$ may be associated with type 1 or type 2 conditions. STA 115-$k$ may be part of a BSS. Accordingly, STA 115-$k$ may be assigned a BSSID or a reduced version of the BSSID that corresponds to the BSS with which STA 115-$k$ is associated. For example, STA 115-$k$ may be assigned an X-bit color indicator. STA 115-$k$ may process frames that include the value of reduced version BSSID (e.g., a color indicator) that corresponds to the associated BSS. In some cases, STA 115-$k$ may detect that more than one BSS is using a same value of a reduced version of a BSSID (e.g., STA 115-$k$ may detect a color collision). STA 115-$k$ may facilitate correction of the collision either independently or via communications with an AP 105. For example, STA 115-$k$ may utilize reduced version BSSID manager 910-$b$ for color collision and resolution. The reduced version BSSID manager 910-$b$ may include a reduced version BSSID detector 1005-$a$, a reduced version BSSID administrator 1010-$a$, a reduced version BSSID evaluator 1015-$a$, and a communication coordinator 1020-$a$. Each of these modules may perform the functions described with reference to FIG. 10. The reduced version BSSID manager 910-$b$ may also include a BSS identification manager 1135.

The BSS identification manager 1135 may be configured to detect a collision of values of a reduced version of BSSIDs by identifying MAC addresses in frames from different BSSs. For example, the BSSID may determine that the MAC addresses in a first frame and a second frame correspond to different BSSs as described with reference to FIGS. 2A-8. The frames may be passed to the BSS identification manager by the communication coordinator 1020-$a$. The BSS identification manager 1135 may also identify a BSSID of neighboring BSSs (e.g., via communication with an AP 105 for each respective BSS). The information obtained by the BSS identification manager 1135 may be used by other components of the reduced version BSSID manager 910-$b$ to detect and resolve collisions as described with reference to FIGS. 2A-8.

The memory 1115 may include random access memory (RAM) and read only memory (ROM). The memory 1115 may store computer-readable, computer-executable software/firmware code 1120 including instructions that, when executed, cause the processor 1125 to implement various features described herein (e.g., detect and resolve collisions, etc.). Alternatively, the software/firmware code 1120 may not be directly executable by the processor 1125 but cause a computer (e.g., when compiled and executed) to implement features described herein. The processor 1125 may include an intelligent hardware device (e.g., a central processing unit (CPU), a microcontroller, an ASIC, etc.).

Figure 11B:
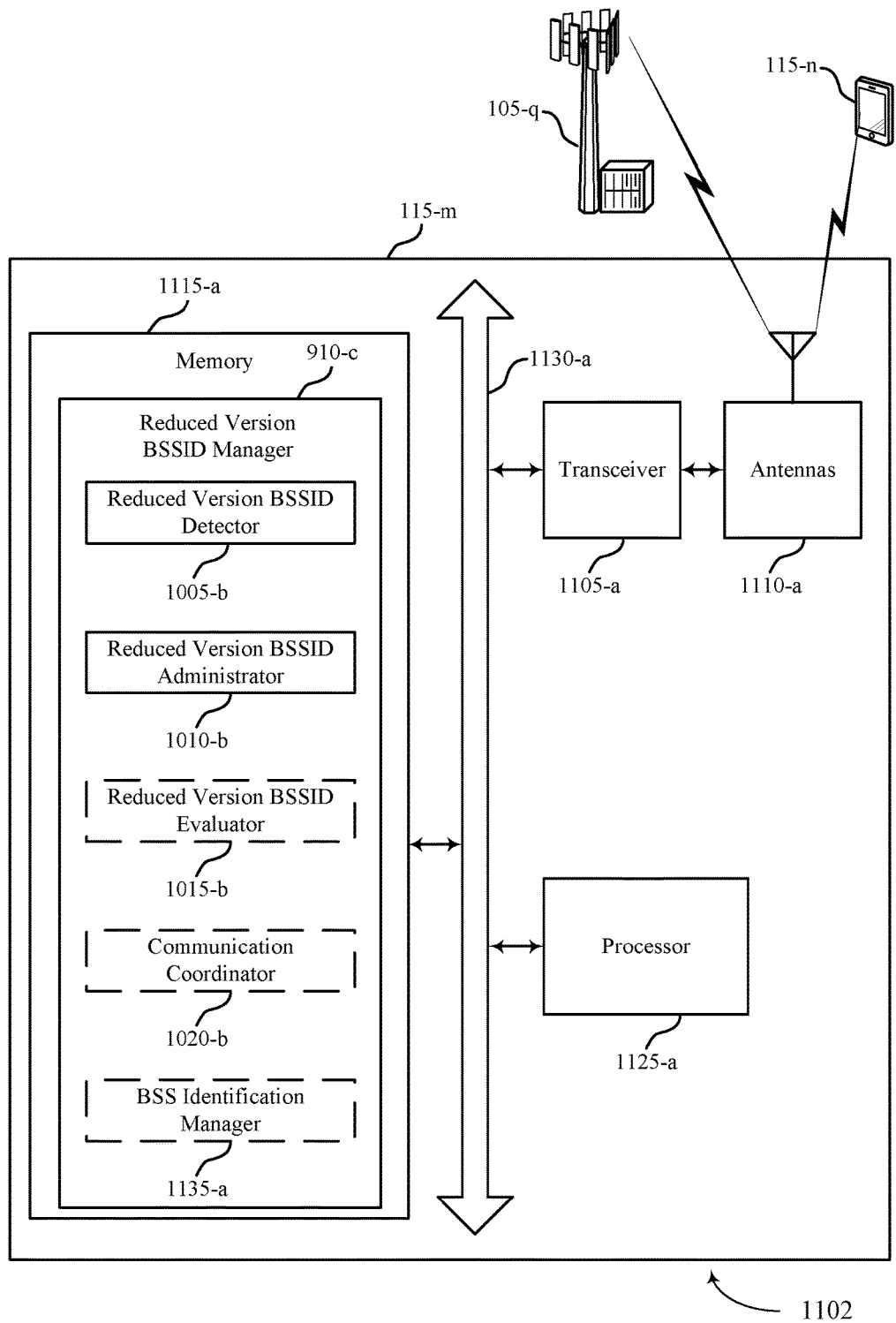
FIG. 11B illustrates a block diagram of a system including a station that supports detection and resolution of a reduced version BSSID collision in accordance with various aspects of the present disclosure.
Figure 12A:
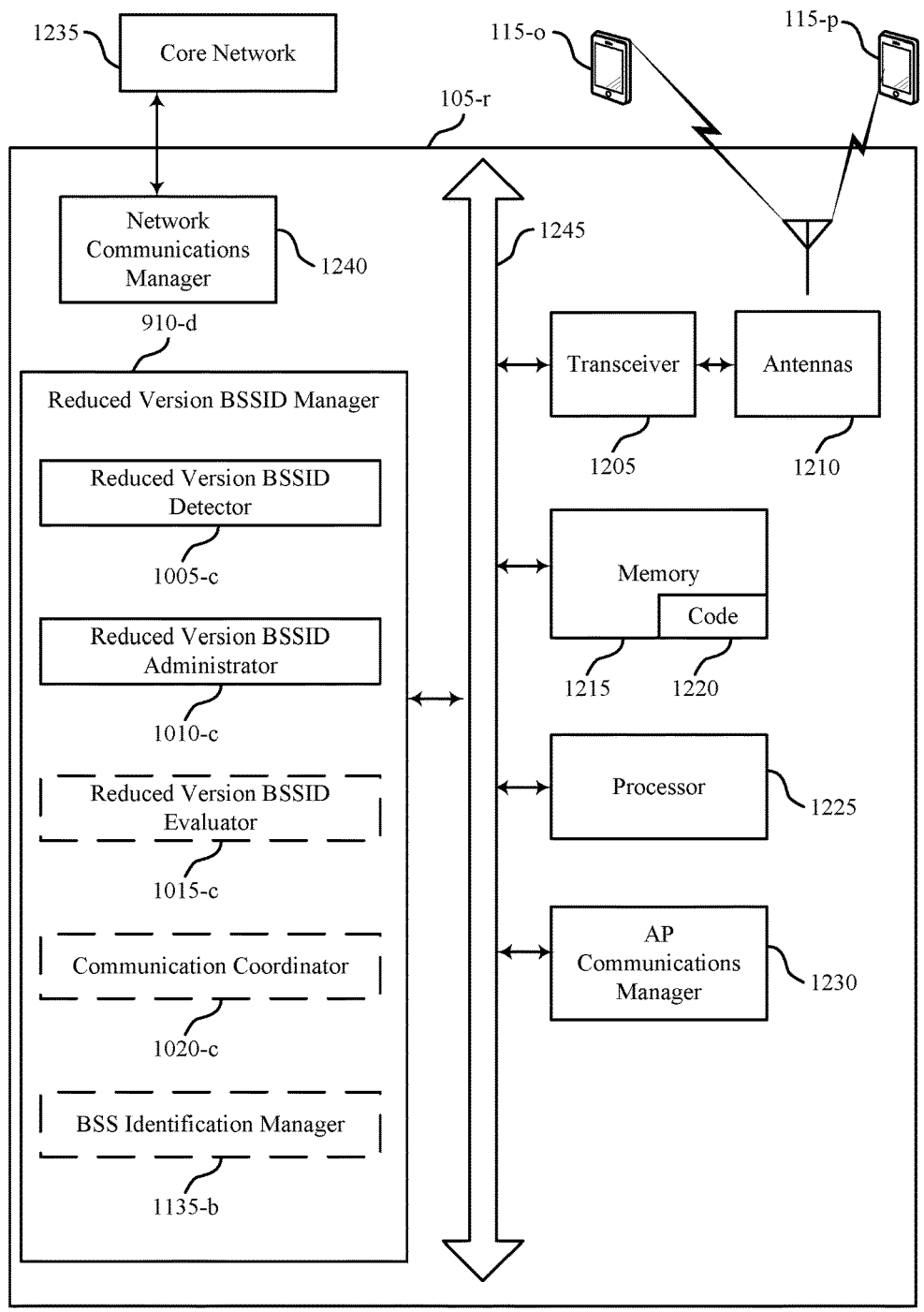
FIG. 12A illustrates a block diagram of a system including an access point that supports detection and resolution of a reduced version BSSID collision in accordance with various aspects of the present disclosure.

FIG. 11B illustrates a block diagram 1102 including a STA 115-$m$ that supports detection and resolution of a reduced version BSSID collision in accordance with various aspects of the present disclosure. STA 115-$m$ of FIG. 11B may be similar to STA 115-$k$ of FIG. 11A, with the exception of the reduced version BSSID manager 910-$c$ of STA 115-$m$ being implemented as computer-readable code stored on memory 1115-$a$ and executable by processor 1125-$a$ of the STA 115-$m$ FIG. 12A illustrates a block diagram of a system 1201 including an AP 105-$r$ that supports detection and resolution of a reduced version BSSID collision in accordance with various aspects of the present disclosure. AP 105-$r$ may be an example of a wireless device or AP 105 described with reference to FIGS. 1-10. AP 105-$r$ may include a reduced version BSSID manager 910-$d$, which may be an example of a reduced version BSSID manager 910 or 910-$a$, described with reference to FIGS. 9 and 10. The reduced version BSSID manager 910-$d$ may include a reduced version BSSID detector 1005-$c$, a reduced version BSSID administrator 1010-$c$, a reduced version BSSID evaluator 1015-$c$, a communication coordinator 1020-$c$, and BSS identification manager 1135-$b$, each of which may perform the functions described with reference to FIGS. 8-11B. AP 105-$r$ may also include components for bi-directional voice and data communications including components for transmitting communications and components for receiving communications. For example, AP 105-$r$ may communicate bi-directionally with STA 115-$o$ or STA 115-0. In some cases, AP 105-$r$ may communication with a central controller (not shown). AP 105-$r$ may be in type 1 or type 2 conditions, such as described with reference to FIGS. 2A and 2B.

The AP 105-$r$ may include a processor 1225, memory 1115 (including software/firmware code 1220), transceiver 1205, and antenna(s) 1210, which each may be in communication, directly or indirectly, with one another (e.g., over bus system 1245). The transceiver 1205 may be configured to communicate bi-directionally, via the antenna(s) 1210, with the STA 115-$o$ and STA 115-$p$, which may be multi-mode devices. The transceiver 1205 (or other components of AP 105-$r$) may also be configured to communicate bi-directionally, via the antennas 1210, with one or more other APs (not shown). The transceiver 1205 may include a modem configured to modulate the packets and provide the modulated packets to the antennas 1210 for transmission, and to demodulate packets received from the antennas 1210. The AP 105-$r$ may include multiple transceivers 1205, each with one or more associated antennas 1210. The transceiver 1205 may be an example of a combined receiver 905 and transmitter 915 of FIG. 9. In some cases, AP 105-$r$ may communicate with other APs (e.g., via backhaul) utilizing AP communications manager 1230. In some cases, AP communications manager 1230 may include a controller or scheduler for controlling communications with STAs 115 in cooperation with other APs 105. In certain aspects, AP 105-$r$ may communicate with the core network 1235 through network communications manager 1240. The core network 1235 may be a central controller as described with reference to FIGS. 1-8.

The memory 1215 may include RAM and ROM. The memory 1215 may also store computer-readable, computer-executable software/firmware code 1220 containing instructions that are configured to, when executed, cause the processor 1225 to implement various features described herein (e.g., detect and resolve collisions of reduced version BSSIDs, etc.). Alternatively, the code 1220 may not be directly executable by the processor 1225 but may be configured to cause the computer (e.g., when compiled and executed) to perform features described herein. The processor 1225 may include an intelligent hardware device (e.g., a CPU, a microcontroller, an ASIC, etc.). The processor 1225 may include various special purpose processors such as encoders, queue processing modules, base band processors, radio head controllers, digital signal processors (DSPs), and the like.

Figure 12B:
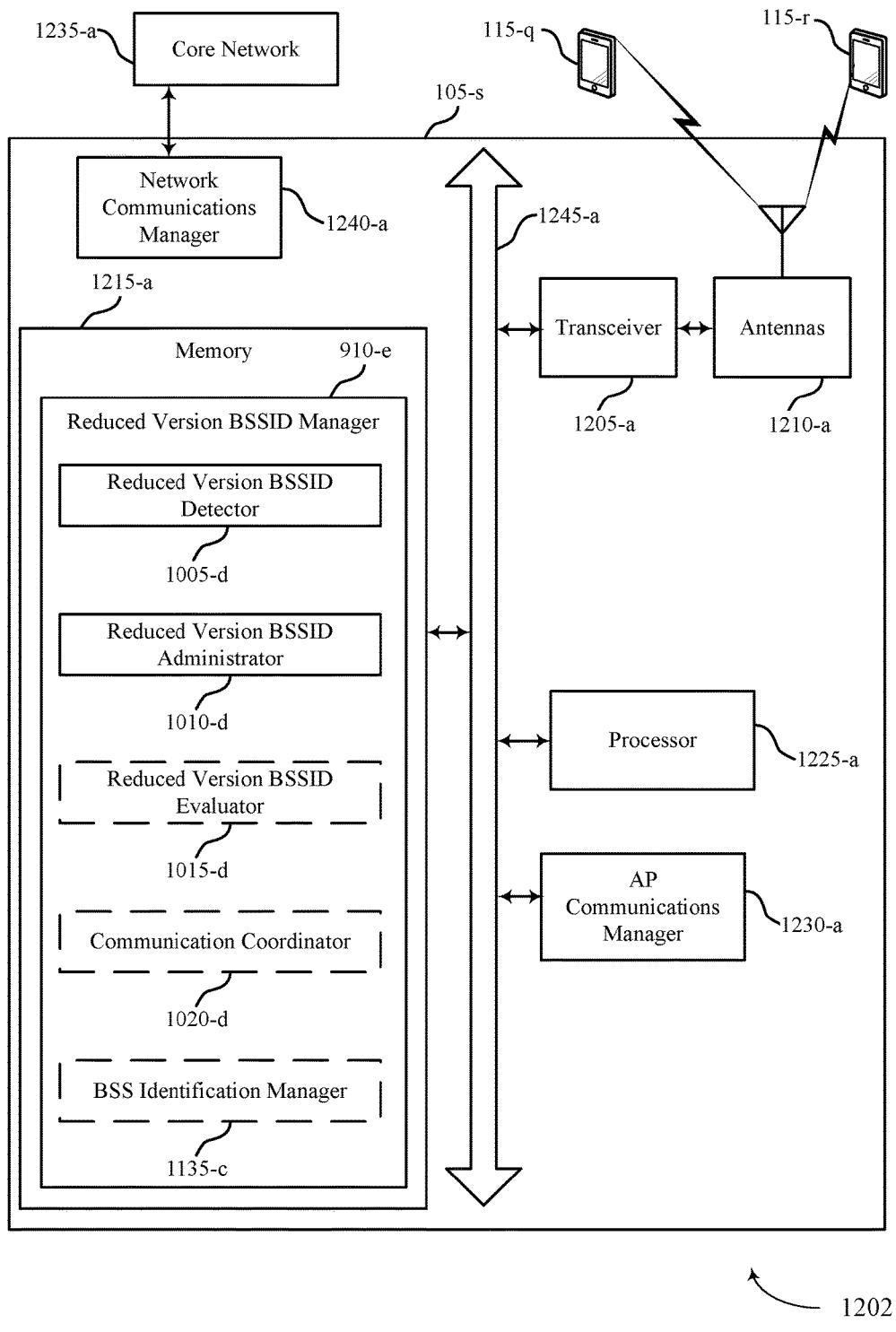
FIG. 12B illustrates a block diagram of a system including an access point that supports detection and resolution of a reduced version BSSID collision in accordance with various aspects of the present disclosure.

FIG. 12B illustrates a block diagram of a system 1202 including an AP 105-$s$ that supports detection and resolution of a reduced version BSSID collision in accordance with various aspects of the present disclosure. AP 105-$s$ of FIG.

12B may be similar to AP 105-*r* of FIG. 12A, with the exception of the reduced version BSSID manager 910-*d* of AP 105-*s* being implemented as computer-readable code stored on memory 1215-*a* and executable by processor 1225-*a* of the AP 105-*s*.

Figure 13:
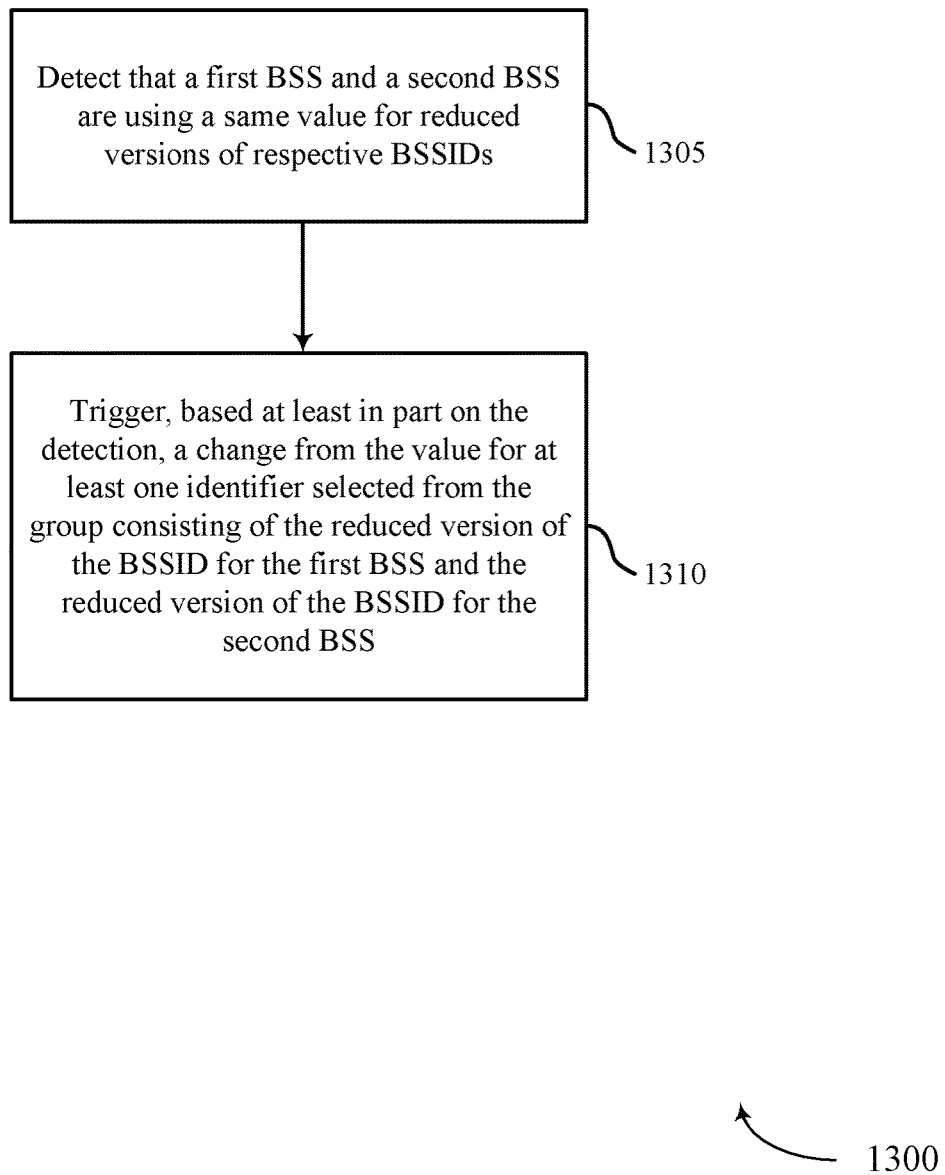
FIG. 13 illustrates a method for detection and resolution of a reduced version BSSID collision in accordance with various aspects of the present disclosure.

FIG. 13 illustrates a method 1300 for detection and resolution of a reduced version BSSID collision in accordance with various aspects of the present disclosure. The operations of method 1300 may be implemented by an AP 105, a STA 115, wireless devices 900 or 1000, or their components as described with reference to FIGS. 1-12B. For example, the operations of method 1300 may be performed by the reduced version BSSID manager 910 as described with reference to FIGS. 9-12B. In some examples, a wireless device executes a set of instructions to control the functional elements of the device to perform the functions described below. Additionally or alternatively, the device may perform aspects the functions described below using special-purpose hardware.

At block 1305, the method may include detecting that a first BSS and a second BSS are using a same value for reduced versions of respective BSSIDs, as described with reference to FIGS. 2A-8. That is, the method may include detecting a collision between neighboring BSSs. In certain examples, the operations of block 1305 may be performed by the reduced version BSSID detector 1005 as described with reference to FIG. 10.

At block 1310, the method may include triggering, based at least in part on the detection, a change from the value for at least one identifier selected from the group consisting of the reduced version of the BSSID for the first BSS and the reduced version of the BSSID for the second BSS, as described with reference to FIGS. 2A-8. For example, the method may include triggering a change in color bits for one of the BSSs involved in the collision. In certain examples, the operations of block 1310 may be performed by the reduced version BSSID administrator 1010 as described with reference to FIG. 10.

Figure 14:
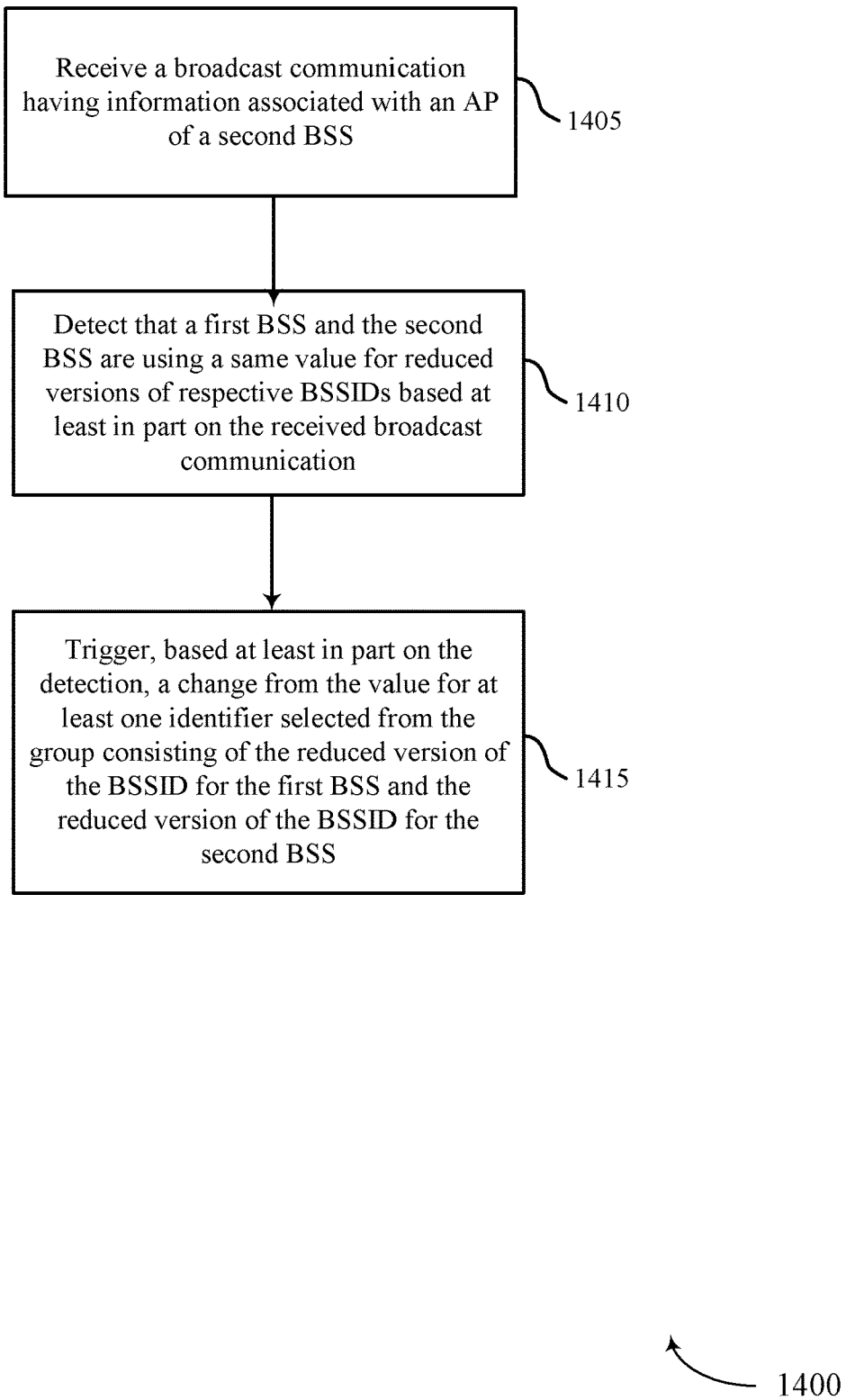
FIG. 14 illustrates a method for detection and resolution of a reduced version BSSID collision in accordance with various aspects of the present disclosure.

FIG. 14 illustrates a method 1400 for detection and resolution of a reduced version BSSID collision in accordance with various aspects of the present disclosure. The operations of method 1400 may be implemented by an AP 105, a STA 115, wireless devices 900 or 1000, or their components as described with reference to FIGS. 1-12B. For example, the operations of method 1400 may be performed by the reduced version BSSID manager 910 as described with reference to FIGS. 9-12B. In some examples, a wireless device executes a set of instructions to control the functional elements of the device to perform the functions described below. Additionally or alternatively, the device may perform aspects of the functions described below using special-purpose hardware. The method 1400 may also incorporate aspects of method 1300 of FIG. 13.

At block 1405, the method may include receiving a broadcast communication having information associated with an AP of a second BSS, as described with reference to FIGS. 2A-8. In some cases, the broadcast communication may be received directly from the AP. In other cases, the broadcast information may be received indirectly (e.g., via a relay from a STA). The broadcast information may include the value (e.g., color bits) for the second BSS. The broadcast information may include a setup time for reduced version identifier or a quantity of unused values associated with the second BSS. In certain aspects, the broadcast information may include the quantity of STAs associated with the second BSS, or the quantity of active STAs. In certain examples, the operations of block 1405 may be performed by the transmitter 915 in conjunction with the communication coordinator 1020 as described with reference to FIGS. 9 and 10.

At block 1410, the method may include detecting that a first BSS and the second BSS are using a same value for reduced versions of respective BSSIDs based at least in part on the received broadcast communication, as described with reference to FIGS. 2A-8. In certain examples, the operations of block 1410 may be performed by the reduced version BSSID detector 1005 as described with reference to FIG. 10.

At block 1415, the method may include triggering, based at least in part on the detection, a change from the value for at least one identifier selected from the group consisting of the reduced version of the BSSID for the first BSS and the reduced version of the BSSID for the second BSS, as described with reference to FIGS. 2A-8. In some cases, the triggering is based at least in part on a comparison of information from the received broadcast communication with corresponding information associated with the first BSS. In certain aspects, the method may include sending an announcement indicating the change in value to STAs associated with the changing BSS. The announcement may include a scheduled change time. The announcement may indicate a restriction mode for the STAs (e.g., whether or not the STAs may transmit before the change). In certain examples, the operations of block 1415 may be performed or facilitated by the reduced version BSSID administrator 1010 and the communication coordinator 1020 as described with reference to FIG. 10.

Figure 15:
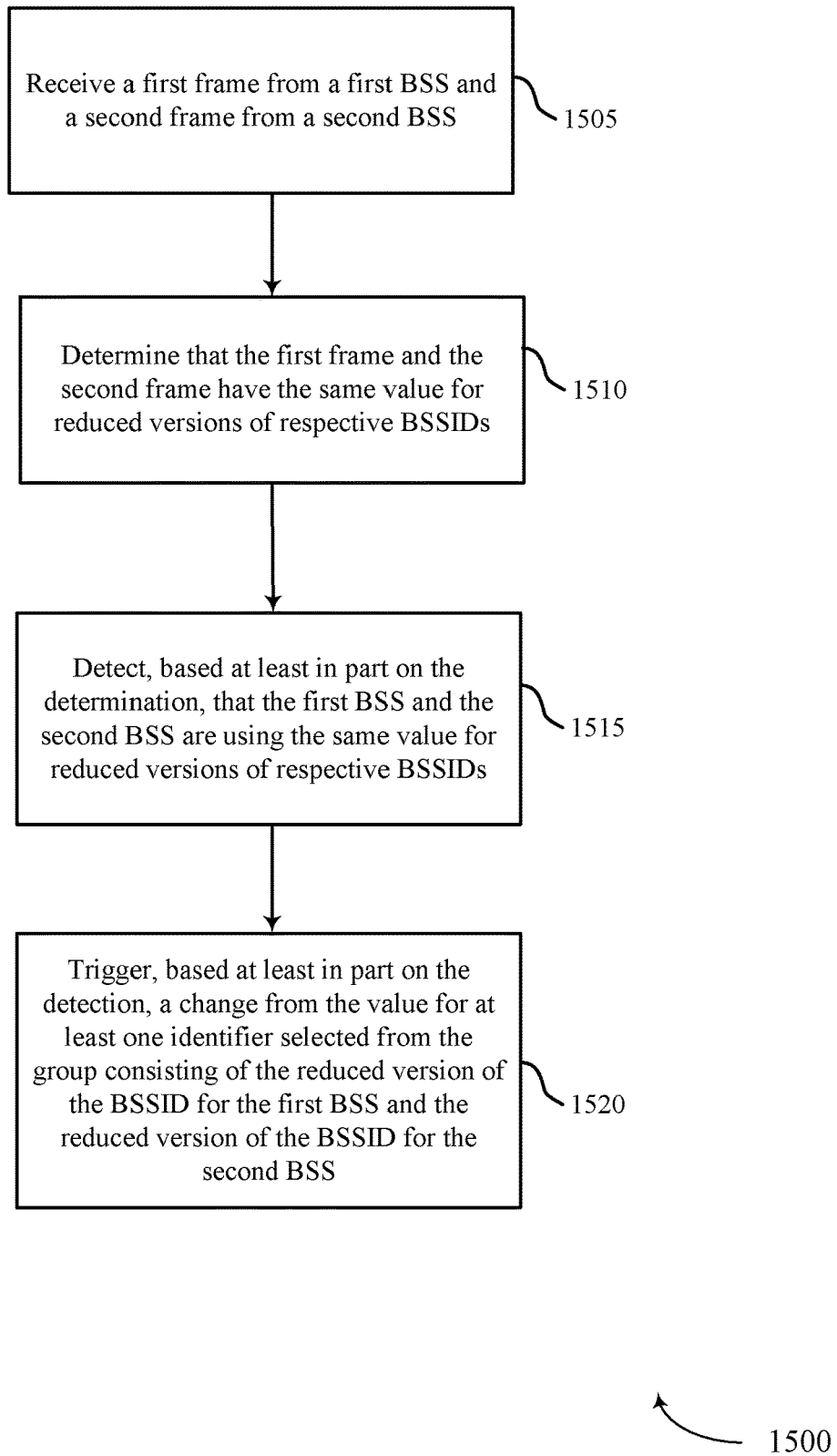
FIG. 15 illustrates a method for detection and resolution of a reduced version BSSID collision in accordance with various aspects of the present disclosure.

FIG. 15 illustrates a method 1500 for detection and resolution of a reduced version BSSID collision in accordance with various aspects of the present disclosure. The operations of method 1500 may be implemented by an AP 105, a STA 115, wireless devices 900 or 1000, or their components as described with reference to FIGS. 1-12B. For example, the operations of method 1500 may be performed by the reduced version BSSID manager 910 as described with reference to FIGS. 9-12B. In some examples, a wireless device executes a set of instructions to control the functional elements of the device to perform the functions described below. Additionally or alternatively, the device may perform aspects of the functions described below using special-purpose hardware. The method 1500 may also incorporate aspects of methods 1300 and 1400 of FIGS. 13 and 14.

At block 1505, the method may include receiving a first frame from a first BSS and second frame from a second BSS, as described with reference to FIGS. 2A-8. The frame may be broadcast, multi-cast, or unicast. In some cases, the frames are relayed from a STA 115. At block 1510, the method may include determining that the first frame and the second frame have the same value for reduced versions of respective BSSIDs. For example, the method may include a comparison of color bits of each frame. In certain examples, the operations of blocks 1505 and 1510 may be performed or facilitated by the communication coordinator 1020 and the BSS identification manager 1135, respectively, as described with reference to FIGS. 10 and 11.

At block 1515, the method may include detecting, based at least in part on the determination made at 1510, that the first BSS and the second BSS are using a same value for reduced versions of respective BSSIDs, as described with reference to FIGS. 2A-8. In some cases, the method may include detecting the collision by identifying the MAC addresses for each respective frame. By comparing the MAC addresses, the method may determine that the frames originated from different BSSs and thus detect the collision. In certain examples, the operations of block 1515 may be performed by the reduced version BSSID detector 1005 as described with reference to FIG. 10.

At block 1520, the method may include triggering, based at least in part on the detection, a change from the value for at least one identifier selected from the group consisting of the reduced version of the BSSID for the first BSS and the reduced version of the BSSID for the second BSS, as described with reference to FIGS. 2A-8. In some cases, the method may include sending a collision report to an AP associated with one of the colliding BSSs. The collision report may indicate that the first BSS and the second BSS have the same value for respective BSSIDs (i.e., the report may indicate a collision between the two involved BSSs). In certain examples, the operations of block 1520 may be performed by the reduced version BSSID administrator 1010 as described with reference to FIG. 10.

Figure 16:
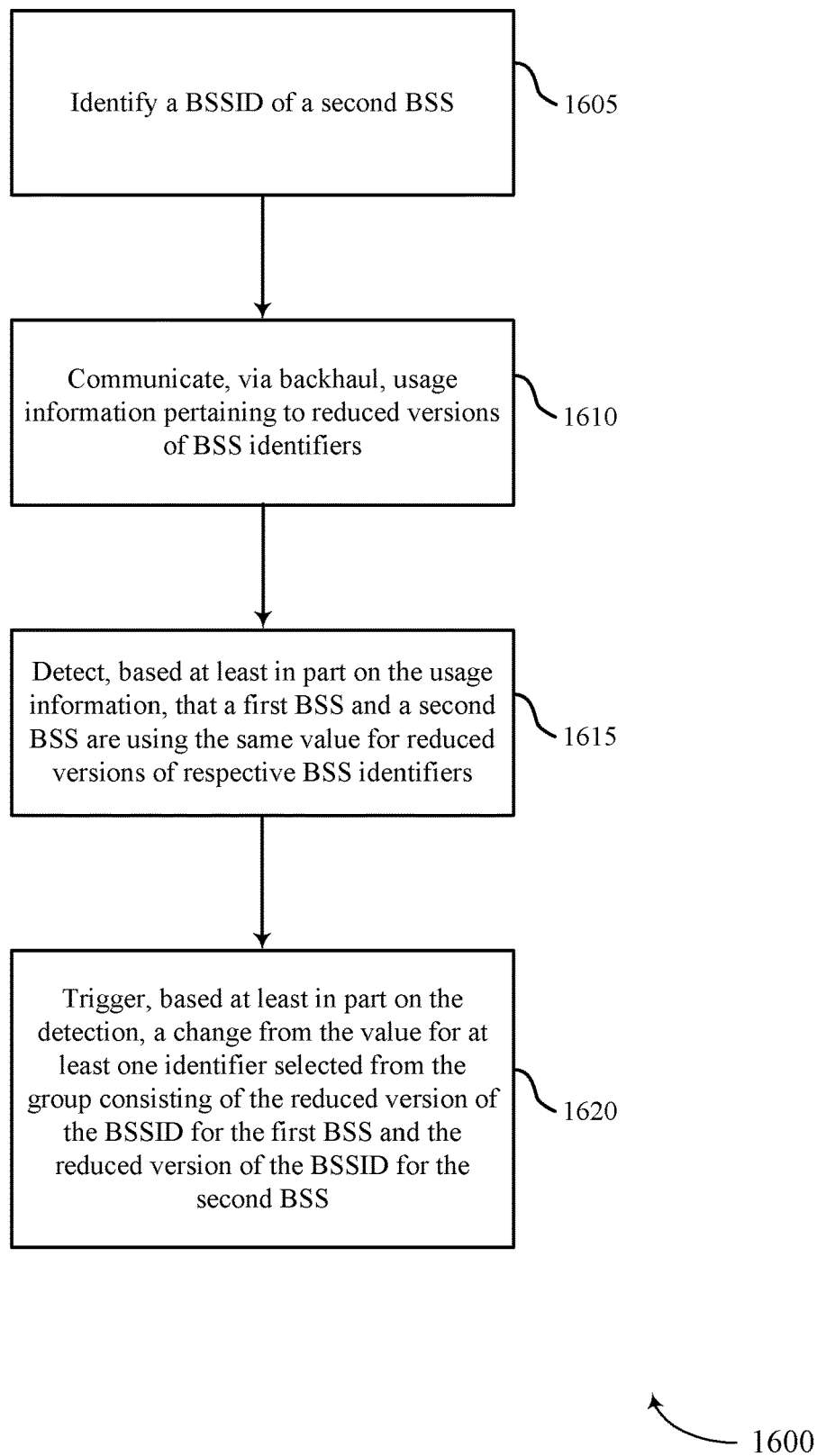
FIG. 16 illustrates a method for detection and resolution of a reduced version BSSID collision in accordance with various aspects of the present disclosure.

FIG. 16 illustrates a method 1600 for detection and resolution of a reduced version BSSID collision in accordance with various aspects of the present disclosure. The operations of method 1600 may be implemented by an AP 105, a STA 115, wireless devices 900 or 1000, or their components as described with reference to FIGS. 1-12B. For example, the operations of method 1600 may be performed by the reduced version BSSID manager 910 as described with reference to FIGS. 9-12B. In some examples, a wireless device executes a set of instructions to control the functional elements of the device to perform the functions described below. Additionally or alternatively, the device may perform aspects of the functions described below using special-purpose hardware. The method 1600 may also incorporate aspects of methods 1300, 1400, and 1500 of FIGS. 13, 14, and 15.

At block 1605, the method may include identifying a BSSID of a second BSS, as described with reference to FIGS. 2A-8. For instance, the method may include detecting the BSSID from a broadcast of the second BSS. Alternatively, the method may include receiving the BSSID indirectly (e.g., in a report from a STA 115). Regardless of how the method identifies the BSSID, the method may, at block 1610, communicate, via backhaul communication, usage information pertaining to reduced versions of respective BSSIDs (e.g., color-use information). For example, the device may send a request to a central controller (or AP associated with the BSSID) asking for the color-use information of the second BSS. Additionally or alternatively, the device may receive color-use information from the central controller or the second BSS AP. In certain examples, the operations of block 1605 may be performed or facilitated by the BSS identification manager 1135 and the communication coordinator 1020, respectively, as described with reference to FIG. 10.

At 1615, the method may include detecting, based at least in part on the usage information, that a first BSS and the second BSS are using a same value for reduced versions of respective BSSIDs, as described with reference to FIGS. 2A-8. In certain examples, the operations of block 1615 may be performed by the reduced version BSSID detector 1005 as described with reference to FIG. 10.

At block 1620, the method may include triggering, based at least in part on the detection, a change from the value for at least one identifier selected from the group consisting of the reduced version of the BSSID for the first BSS and the reduced version of the BSSID for the second BSS, as described with reference to FIGS. 2A-8. The triggering may be autonomous, or at request. In some cases, the method may include determining which BSS should change value of reduced version of BSS identification. The determination may be based at least in part on the usage information. In some cases, the method may include determining the value that the changing BSS should use for the reduced version of the BSSID. That is, the method may include determining the color bits for the BSS. The method may include sending a change request to the BSS that is determined should change values. In certain examples, the operations of block 1620 may be performed by the reduced version BSSID administrator 1010 as described with reference to FIG. 10.

Figure 17:
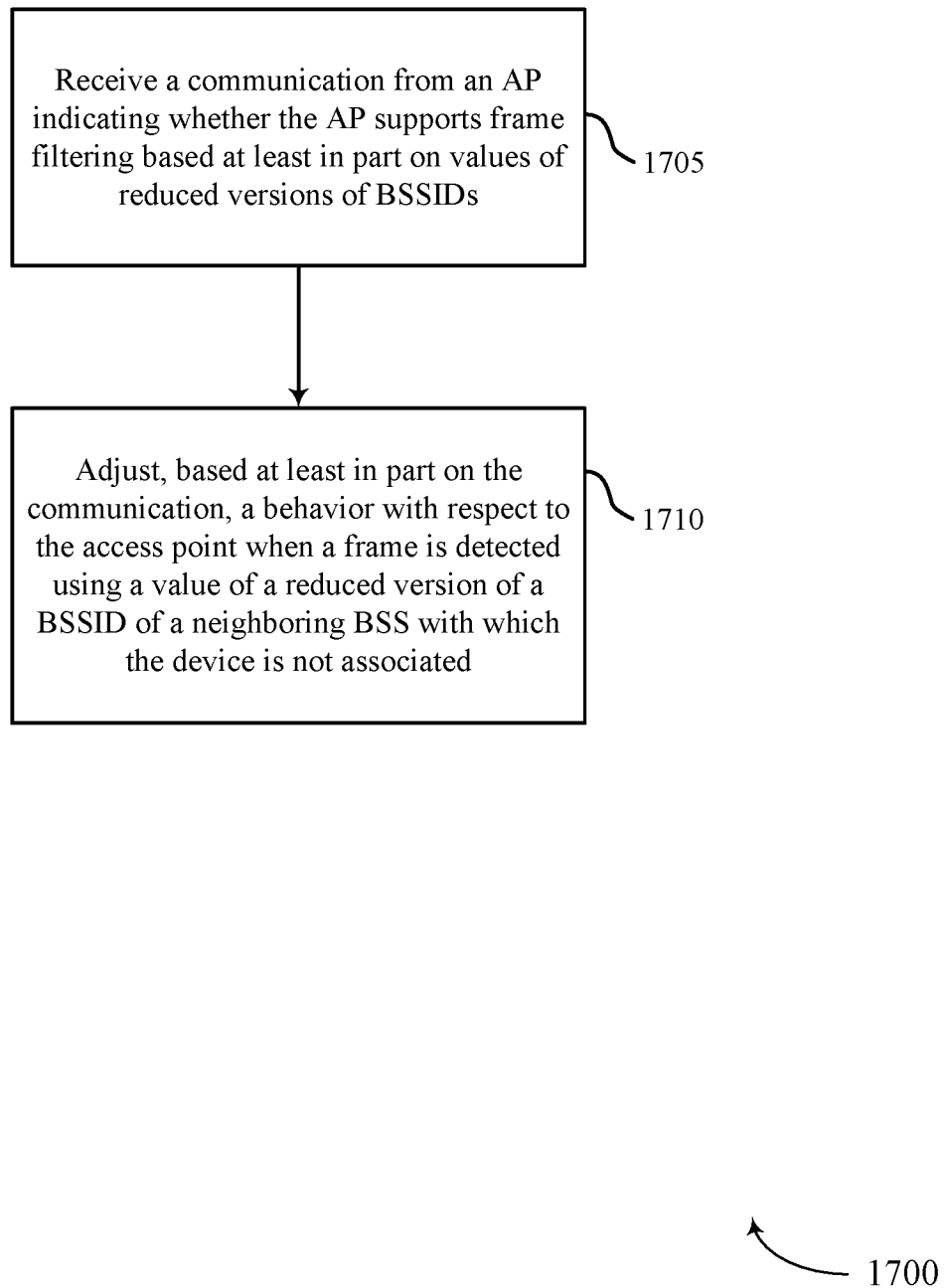
FIG. 17 illustrates a method for detection and resolution of a reduced version BSSID collision in accordance with various aspects of the present disclosure.

FIG. 17 illustrates a method 1700 for detection and resolution of a reduced version BSSID collision in accordance with various aspects of the present disclosure. The operations of method 1700 may be implemented by an AP 105, a STA 115, wireless devices 900 or 1000, or their components as described with reference to FIGS. 1-12B. For example, the operations of method 1700 may be performed by the reduced version BSSID manager 910 as described with reference to FIGS. 9-12B. In some examples, a wireless device executes a set of instructions to control the functional elements of the device to perform the functions described below. Additionally or alternatively, the device may perform aspects of the functions described below using special-purpose hardware. The method 1600 may also incorporate aspects of methods 1300, 1400, 1500, and 1600 of FIGS. 13, 14, 15, and 16.

At block 1705, the method may include receiving a communication from an AP indicating whether the AP supports frame filtering based at least in part on values of reduced versions of BSSIDs, as described with reference to FIGS. 2A-8. For example, the communication may indicate the capability of the AP to support color-based frame filter. In certain examples, the operations of block 1705 may be performed by the communication coordinator 1020 in conjunction with the transmitter 915 as described with reference to FIGS. 9 and 10.

At block 1710, the method may include adjusting, based at least in part on the communication, a behavior with respect to the AP when a frame is detected using a value of a reduced version of a BSSID of a neighboring BSS with which the device is not associated, as described with reference to FIGS. 2A-8. The value may be in a first portion of the frame. When the communication indicates that the AP does not support frame filtering, the adjustment may include entering a sleep mode for a second part of the frame. When the communication indicates that the AP does support frame filtering, the adjustment may include transmitting over a second portion of the frame. In certain examples, the operations of block 1710 may be performed by the reduced version BSSID detector 1005 as described with reference to FIG. 10.

Thus, methods 1300, 1400, 1500, 1600, and 1700 may provide for detection and resolution of a reduced version BSSID collision. It should be noted that methods 1300, 1400, 1500, 1600, and 1700 describe possible implementation, and that the operations and the steps may be rearranged or otherwise modified such that other implementations are possible. In some examples, aspects from two or more of the methods 1300, 1400, 1500, 1600, and 1700 are combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of communication, comprising:
   receiving, at a first wireless device, an indication that a first reduced basic service set identifier (BSSID) is being used for a first basic service set (BSS) by a second wireless device;
   identifying a BSSID of the first BSS;
   communicating, via a backhaul communication, usage information pertaining to respective reduced BSSIDs with at least one or more of: a central controller or the second wireless device, the communicating based at least in part on the identified BSSID of the first BSS;
   detecting that the first reduced BSSID being used for the first BSS is being used for a second BSS based at least in part on the usage information communicated via the backhaul communication; and
   transmitting, to the second wireless device, a request to change from the first reduced BSSID for the first BSS based at least in part on the detecting.

2. The method of claim 1, wherein receiving the indication that the first reduced BSSID is being used for the first BSS by the second wireless device comprises:

receiving a broadcast communication from the second wireless device, wherein the broadcast communication includes the first reduced BSSID being used for the first BSS.

3. The method of claim 1, wherein receiving the indication that the first reduced BSSID is being used for the first BSS by the second wireless device comprises:
receiving the first reduced BSSID being used for the first BSS from a station associated with the second BSS, the first reduced BSSID being used for the first BSS having been received at the station associated with the second BSS via a broadcast communication from the second wireless device.

4. The method of claim 1, further comprising:
determining a second reduced BSSID that is not in use by the first BSS or the second BSS, wherein the request to change from the first reduced BSSID for the first BSS is based at least in part on the second reduced BSSID.

5. The method of claim 4, wherein determining the second reduced BSSID comprises:
determining that the second reduced BSSID is not in use by neighboring BSSs other than the first BSS and the second BSS.

6. The method of claim 1, further comprising:
receiving a broadcast communication including information associated with the second wireless device, wherein the information includes at least one selected from the group consisting of: a setup time for reduced BSSIDs, a quantity of available values for reduced BSSIDs of the first BSS, a quantity of available values for reduced BSSIDs of other BSSs that neighbor the first BSS, a quantity of stations associated with the first BSS, and a quantity of active stations.

7. The method of claim 6, further comprising:
comparing the received broadcast information to corresponding information of the second BSS, wherein transmitting the request to change from the first reduced BSSID for the first BSS is based at least in part on the comparison.

8. The method of claim 1, further comprising:
receiving a first frame from the first BSS, the first frame including the first reduced BSSID for the first BSS; and
receiving a second frame from the second BSS, the second frame including the first reduced BSSID for the second BSS.

9. The method of claim 8, wherein detecting that the first reduced BSSID being used for the first BSS is being used for a second BSS comprises:
identifying a media access control (MAC) address of the first BSS in the first frame;
identifying a MAC address of the second BSS in the second frame; and
determining, based at least in part on the MAC address of the first BSS and the MAC address of the second BSS, that the first frame and the second frame are from different BSSs.

10. The method of claim 9, further comprising:
sending a collision report to one or both of the second wireless device or a third wireless device associated with the second BSS, the collision report indicating that the first reduced BSSID being used for the first BSS is being used for the second BSS.

11. The method of claim 1, further comprising:
sending a request for the usage information of the first BSS to the at least one selected from the group consisting of the central controller and the second wireless device.

12. The method of claim 1, wherein communicating the usage information comprises:
receiving the usage information of the first BSS from the at least one selected from the group consisting of the central controller or the second wireless device.

13. The method of claim 1, further comprising:
transmitting, to a third wireless device associated with the second BSS, a request to change from the first reduced BSSID being used for the second BSS.

14. The method of claim 1, wherein detecting that the first reduced BSSID being used for the first BSS is being used for a second BSS comprises:
receiving a request to change from the first reduced BSSID for at least one of the first BSS or the second BSS.

15. The method of claim 1, further comprising:
transmitting an announcement of the request to change from the first reduced BSSID for stations served by the first BSS.

16. The method of claim 15, wherein the announcement comprises a scheduled time for the change request.

17. The method of claim 15, wherein the announcement comprises an indication of a transmission restriction mode.

18. The method of claim 1, wherein the second BSS is associated with the first wireless device.

19. The method of claim 1, wherein the second BSS is associated with a third wireless device.

20. A communications device comprising:
a reduced version basic service set identifier (BSSID) detector for receiving an indication that a first reduced BSSID is being used for a first basic service set (BSS) by a second communications device and for detecting that the first reduced BSSID being used for the first BSS is being used for a second BSS;
a BSS identification manager for identifying a BSSID of the first BSS; and
a communication coordinator for facilitating communication, via backhaul, of use information pertaining to reduced respective BSSIDs with at least one or more of: a central controller or the second communications device based at least in part on the BSSID of the first BSS, wherein the reduced version BSSID detector detects that the first reduced BSSID being used for the first BSS is being used for a second BSS based at least in part on the usage information communicated via the backhaul; and
a reduced version BSSID administrator for transmitting, to the second communications device, a request to change from the first reduced BSSID for the first BSS based at least in part on the detecting.

21. The communications device of claim 20, further comprising:
a communication coordinator to facilitate receiving a broadcast communication from the second communications device, wherein the broadcast communication includes the first reduced BSSID being used for the first BSS.

22. The communications device of claim 20, further comprising:
a communication coordinator to facilitate receiving the first reduced BSSID being used for the first BSS from a station associated with the second BSS, the first reduced BSSID being used for the first BSS having been received at the station associated with the second BSS via a broadcast communication from the second communications device.

23. The communications device of claim 20, further comprising:
   a reduced version BSSID evaluator for determining a second reduced BSSID that is not in use by the first BSS or the second BSS, wherein the request to change from the first reduced BSSID for the first BSS is based at least in part on the second reduced BSSID.

24. The communications device of claim 23, wherein the reduced version BSSID evaluator further supports determining that the second reduced BSSID is not in use by neighboring BSSs other than the first BSS and the second BSS.

25. The communications device of claim 20, further comprising:
   a communication coordinator to facilitate receiving a broadcast communication including information associated with the second communications device, wherein the information includes at least one selected from the group consisting of: a setup time for reduced BSSIDs, a quantity of available values for reduced BSSIDs of the first BSS, a quantity of available values for reduced BSSIDs of other BSSs that neighbor the first BSS, a quantity of stations associated with the first BSS, and a quantity of active stations.

26. The communications device of claim 20, further comprising:
   a communication coordinator to facilitate receiving a first frame from the first BSS, the first frame including the first reduced BSSID for the first BSS, and receiving a second frame from the second BSS, the second frame including the first reduced BSSID for the second BSS.

27. A communications device, comprising:
   a processor;
   memory in communication with the processor; and
   instructions stored in the memory and executable by the processor to cause the communications device to:
      receive an indication that a first reduced basic service set identifier (BSSID) is being used for a first basic service set (BSS) by a second communications device;
      identify a BSSID of the first BSS;
      communicate, via a backhaul communication, usage information pertaining to respective reduced BSSIDs with at least one or more of: a central controller or the second wireless device, the communication based at least in part on the identified BSSID of the first BSS;
      detect that the first reduced BSSID being used for the first BSS is being used for a second BSS based at least in part on the usage information communicated via the backhaul communication; and
      transmit, to the second communications device, a request to change from the first reduced BSSID for the first BSS based at least in part on the detection.

28. A non-transitory computer-readable medium storing code for communication at a wireless device, the code comprising instructions executable to:
   receive, at the wireless device, an indication that a first reduced basic service set identifier (BSSID) is being used for a first basic service set (BSS) by a second wireless device;
   identify a BSSID of the first BSS;
   communicate, via a backhaul communication, usage information pertaining to respective reduced BSSIDs with at least one or more of: a central controller or the second wireless device, the communication based at least in part on the identified BSSID of the first BSS;
   detect that the first reduced BSSID being used for the first BSS is being used for a second BSS based at least in part on the usage information communicated via the backhaul communication; and
   transmit, to the second wireless device, a request to change from the first reduced BSSID for the first BSS based at least in part on the detection.

* * * * *